US009521020B2

(12) United States Patent  (10) Patent No.: US 9,521,020 B2
Kainulainen et al.  (45) Date of Patent: Dec. 13, 2016

(54) DATA PACKET PROCESSING FOR ESTIMATION OF A DIRECTION TOWARDS A TRANSMITTER

(71) Applicant: Nokia Technologies Oy, Espoo (FI)

(72) Inventors: Antti Paavo Tapani Kainulainen, Espoo (FI); Ilari Aleksi Teikari, Helsinki (FI); Ville Valtteri Ranki, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 14/624,701

(22) Filed: Feb. 18, 2015

(65) Prior Publication Data

US 2015/0163622 A1    Jun. 11, 2015

Related U.S. Application Data

(62) Division of application No. 12/737,461, filed as application No. PCT/EP2008/059407 on Jul. 17, 2008, now Pat. No. 9,137,058.

(51) Int. Cl.
*H04B 7/00* (2006.01)
*H04B 1/10* (2006.01)
(Continued)

(52) U.S. Cl.
CPC ............ *H04L 25/03866* (2013.01); *G01S 3/16* (2013.01); *H04B 1/10* (2013.01); *H04B 7/086* (2013.01);
(Continued)

(58) Field of Classification Search
CPC .... H04L 25/03866; H04B 1/10; H04B 7/0814
(Continued)

(56) References Cited

U.S. PATENT DOCUMENTS 4,864,617 A    9/1989  Holmquist
6,246,366 B1 * 6/2001  Speight ................... G01S 3/023
                                                    342/378
(Continued)

FOREIGN PATENT DOCUMENTS

EP    0367487    5/1990
EP    0953850    11/1999
(Continued)

OTHER PUBLICATIONS

Roy, Richard et al.; "ESPIRIT—Estimation of Signal Parameters Via Rotational Invariance Techniques"; IEEE Transactions on Acoustics, Speech, and Signal Processing, vol. 37, No. 7, Jul. 1989; pp. 984-995.
(Continued)

*Primary Examiner* — Ayodeji Ayotunde
(74) *Attorney, Agent, or Firm* — Locke Lord LLP

(57) ABSTRACT

It is disclosed to insert an anti-whitened data block, which is obtainable from a specific data block by anti-whitening, into a data block that is to be whitened by a whitening to yield a whitened data block, wherein the anti-whitening compensates the whitening so that the whitened data block will comprise the specific data block in non-whitened form. It is further disclosed to output, in a first operating mode, an output data block generated by one of whitening and de-whitening an input data block in its entirety, and outputting, in a second operating mode, one of: an output data block generated by one of whitening and de-whitening all parts of an input data block under exclusion of a specific data block contained in the input data block.

25 Claims, 11 Drawing Sheets

(51) Int. Cl.
*H04L 25/03* (2006.01)
*G01S 3/16* (2006.01)
*H04B 7/08* (2006.01)
*H04L 25/02* (2006.01)
*H04L 25/08* (2006.01)
*H04W 4/00* (2009.01)

(52) U.S. Cl.
CPC ......... *H04B 7/0814* (2013.01); *H04L 25/0204* (2013.01); *H04L 25/08* (2013.01); *H04W 4/008* (2013.01)

(58) Field of Classification Search
USPC .......................................... 455/41.2, 73, 303
See application file for complete search history.

(56) References Cited

U.S. PATENT DOCUMENTS

| | | |
|---|---|---|
| 6,255,991 B1 | 7/2001 | Hedin |
| 6,400,320 B1 | 6/2002 | Stilp et al. |
| 6,693,591 B2 | 2/2004 | Ferreol et al. |
| 2001/0020917 A1 | 9/2001 | Hamada et al. |
| 2003/0235147 A1 | 12/2003 | Walton et al. |
| 2004/0022335 A1* | 2/2004 | Arslan ............ H04B 1/123 375/346 |
| 2004/0085917 A1 | 5/2004 | Fitton et al. |
| 2006/0083328 A1* | 4/2006 | Green ............ H04L 25/03866 375/295 |
| 2006/0182201 A1 | 8/2006 | Lindenmeier et al. |
| 2007/0189412 A1 | 8/2007 | Xia et al. |
| 2007/0224953 A1 | 9/2007 | Nakagawa et al. |
| 2008/0125040 A1 | 5/2008 | Kalayjian |
| 2008/0144493 A1 | 6/2008 | Yeh |

FOREIGN PATENT DOCUMENTS

| | | |
|---|---|---|
| EP | 1648128 | 4/2006 |
| EP | 1742215 | 1/2007 |
| GB | 2384957 | 8/2003 |
| JP | 2005065010 | 3/2005 |
| WO | WO96/22662 | 7/1996 |
| WO | WO96/26576 | 8/1996 |
| WO | WO02/054850 | 7/2002 |
| WO | WO2006/029790 | 3/2006 |

OTHER PUBLICATIONS

Schmidt, Ralph O.; "Multiple Emitter Location and Signal Parameter Estimation"; IEEE Transactions on Antennas and Propagation, vol. AP-34, No. 3, Mar. 1989; pp. 276-280.

Erhel, Y. et al.; "H.F. Radio Direction Finding Operating on an Heterogeneous Array of Antennas"; 10th International Conference on Antennas and Propagation, Apr. 14-17, 1997, Conference Publication No. 436; pp. 2.59-2.62.

Bromberg, Matthew C. et al.; "Direction Finding for Unstructured Emitters in the Presence of Structured Interferers"; IEEE 1998; pp. 2537-2540.

Lindholm, Tancred; "Setting up a Bluetooth Packet Transport Link"; Department of Computer Science, Helsinki University of Technology; Jun. 4, 2001; whole document.

Zarnich, Robert E.; Passive Acoustic Broadband Processing 'A Fresh Look'; Dept. of Navy, PEO(USW), Advances Systems and Technology Office; 1999; whole document.

Specification of the Bluetooth System, Master Table of Contents & Compliance Requirements, Wireless Connections Made Easy, Specification vol. 0, Covered Core Package Version 2.1 + EDR Current Master TOC; Issued Jul. 26, 2007; whole document.

International Search Report for International Application No. PCT/EP2008/059407—Date of Completion of Search: Dec. 2, 2009, 7 pages.

PCT Written Opinion of the International Searching Authority for International Application No. PCT/EP2008/059407—Date of Completion of Opinion: Dec. 2, 2009, 15 pages.

International Preliminary Report on Patentability for International Application No. PCT/EP2008/059407—Date of Completion of this Report: Oct. 6, 2010, 25 pages.

* cited by examiner

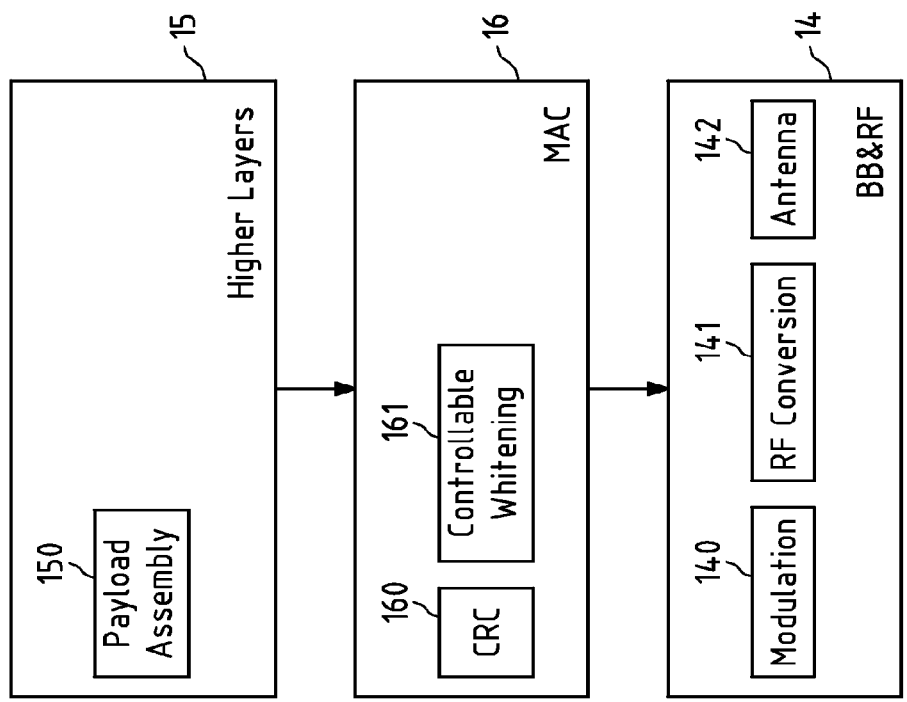
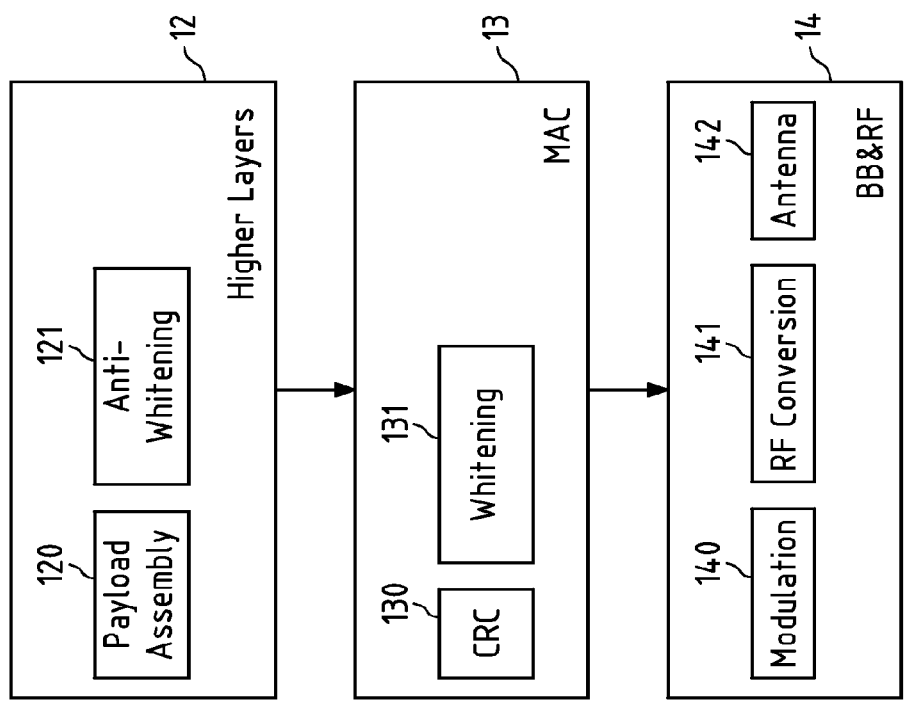

DATA PACKET PROCESSING FOR ESTIMATION OF A DIRECTION TOWARDS A TRANSMITTER

CROSS REFERENCE TO RELATED APPLICATIONS

This application is a divisional of co-pending patent application Ser. No. 12/737,461 filed on Mar. 3, 2011 (hereby incorporated by reference), which is the U.S. National Stage of International Application Number PCT/EP2008/059407 filed on Jul. 17, 2008 which was published in English on Jan. 21, 2010 under International Publication Number WO 2010/006651.

FIELD

This invention relates to data block processing in Communications Systems.

BACKGROUND

In the recent decades, wireless communications systems have gained particular interest since they allow for rather flexible transfer of data between various types of electronic devices. In particular in the field of short-range inter-device communication, the Bluetooth® protocol as specified in Bluetooth Specification Version 2.1+EDR by the Bluetooth Special Interest Group (SIG), available from www.bluetooth.com, is frequently deployed. Bluetooth operates in the globally unlicensed Industrial, Scientific and Medical (ISM) 2.4 GHz short-range radio frequency band and facilitates connection of multiple devices in particular with respect to synchronization issues.

Apart from its data transmission capabilities, the Bluetooth protocol can be used to locate objects, as disclosed in U.S. Patent Application Publication US 2008/0125040. This can for instance be achieved by using directional antennas to determine the direction towards a first device from a second device. This information can then be presented to a user on a display of the second device to direct the user to the first device.

SUMMARY OF SOME EXEMPLARY EMBODIMENTS OF THE INVENTION

Direction estimation with single-channel multi-antenna transmitters and/or receivers in wireless communications systems may be hindered if data is whitened prior to transmission, which is for instance performed in order to randomize the data from highly redundant patterns and/or to minimize Direct Current (DC) bias. Furthermore, received data may be corrupted when switching between the multiple antennas.

First Aspect of the Invention

According to a first aspect of the present invention, a first apparatus is disclosed, comprising means for inserting an anti-whitened data block, which is obtainable from a specific data block by anti-whitening, into a data block that is to be whitened by a whitening to yield a whitened data block, wherein the anti-whitening compensates the whitening so that the whitened data block will comprise the specific data block in non-whitened form. The apparatus may for instance further comprise means for receiving the data block that is to be whitened. The apparatus may for instance further comprise means for one of determining and receiving the specific data block.

The means for inserting the anti-whitened data block into the data block that is to be whitened may for instance comprise a processor that is configured to insert the anti-whitened data block into the data block that is to be whitened. The processor may for instance be implemented in hardware alone, may have certain aspects in software alone, or may be a combination of hardware and software (e.g., at least one processor and at least one memory including program code).

According to the first aspect of the present invention, further a second apparatus is disclosed, comprising a processor configured to insert an anti-whitened data block, which is obtainable from a specific data block by anti-whitening, into a data block that is to be whitened by a whitening to yield a whitened data block, wherein the anti-whitening compensates the whitening so that the whitened data block will comprise the specific data block in non-whitened form.

The processor may for instance be implemented in hardware alone, may have certain aspects in software alone, or may be a combination of hardware and software (e.g., at least one processor and at least one memory including program code).

According to the first aspect of the present invention, further a method is disclosed, comprising inserting an anti-whitened data block, which is obtainable from a specific data block by anti-whitening, into a data block that is to be whitened by a whitening to yield a whitened data block, wherein the anti-whitening compensates the whitening so that the whitened data block will comprise the specific data block in non-whitened form.

According to the first aspect of the present invention, further a program is disclosed, comprising program code for performing the method according to the first aspect of the present invention, when the program is executed on a processor. The program may for instance be distributed via a network, such as for instance the Internet. The program may for instance be stored on a readable-medium, for instance a computer-readable or processor-readable medium. The readable medium may for instance be embodied as an electric, magnetic, electro-magnetic, optic or other storage medium, and may either be a removable medium or a medium that is fixedly installed in an apparatus or device.

According to the first aspect of the present invention, further a readable storage medium encoded with instructions that, when executed by a processor, perform the method according to the first aspect of the present invention is disclosed. The readable storage medium may for instance be a computer-readable or processor-readable storage medium. It may be embodied as an electric, magnetic, electro-magnetic, optic or other storage medium, and may either be a removable storage medium or a storage medium that is fixedly installed in an apparatus or device.

According to the first aspect of the present invention, further a program is disclosed which causes a processor to insert an anti-whitened data block, which is obtainable from a specific data block by anti-whitening, into a data block that is to be whitened by a whitening to yield a whitened data block, wherein the anti-whitening compensates the whitening so that the whitened data block will comprise the specific data block in non-whitened form. The program may for instance be stored on a readable medium, for instance a computer-readable or processor-readable medium. The readable medium may for instance be embodied as an electric, magnetic, electro-magnetic, optic or other storage medium, and may either be a removable medium or a medium that is fixedly installed in an apparatus or device.

According to the first aspect of the present invention, the anti-whitened data block is inserted into the data block that is to be whitened. The anti-whitened data block is obtainable from a specific data block by anti-whitening of the specific data block. Therein, the anti-whitening may for instance be performed by the first or second apparatus according to the first aspect of the present invention, or by another apparatus. The whitening of the data block that is to be whitened may for instance be performed by the first or second apparatus according to the first aspect of the present invention, or by another apparatus. The anti-whitening compensates the whitening, for instance in away that a data block that has been anti-whitened and subsequently whitened equals the data block prior to the anti-whitening and whitening. The whitening may for instance be a transformation that makes a signal more similar to white noise, wherein white noise is understood as a signal with a flat power spectral density. The whitening may for instance be implemented by a linear feedback shift register. The anti-whitening may also be implemented by a linear feedback shift-register.

Since the anti-whitening performed on the specific data block compensates the whitening performed on the data block that is to be whitened, the whitened data block comprises the specific data block in non-whitened form, whereas the rest of the whitened data block is in whitened form. The anti-whitening performed on the specific data block thus compensates for a whitening operation, which may for instance take place in a subsequent processing stage prior to transmission.

It is thus possible to add data (the specific data block) to a data block (the data block that is to be whitened) before the whitening operation of this data block and to still have this data (the specific data block) in non-whitened form after the whitening operation (in the whitened data block). Specific properties of the specific data block may thus be preserved without requiring a whitening operation of a subsequent processing stage to be modified or disabled. The specific properties of the specific block may for instance be the usability of the specific data block for direction estimation with a single-channel multi-antenna transmitter and/or receiver.

In an exemplary embodiment of the first aspect of the present invention, the first or second apparatus according to the first aspect of the present invention is a host processor of a Bluetooth device or apart thereof. The first or second apparatus according to the first aspect of the present invention may also be a module to be used in a host processor of a Bluetooth device or to be used in a part thereof. Performing anti-whitening in such a host processor may allow preserving specific properties of the specific data block without requiring changes of the Medium Access Control/Burst-Mode Control (MAC)/BMC, in which the whitening operation is implemented.

In an exemplary embodiment of the first aspect of the present invention, the data block that is to be whitened may comprise a Protocol Data Unit (PDU) part and a Cyclic Redundancy Check (CRC) part of a Bluetooth packet, for instance an advertisement or data packet. The anti-whitened data block may for instance be inserted into at least a part of the payload section of the PDU. The whitened data block may be a whitened representation of the PDU and CRC parts.

In an exemplary embodiment of the first aspect of the present invention, the anti-whitened data part may for instance be the only data in the data block that is to be whitened, or may completely fill the data block that is to be whitened. For instance, if the data block that is to be whitened comprises a Protocol Data Unit (PDU) part and a Cyclic Redundancy Check (CRC) part of a Bluetooth packet, for instance an advertisement or data packet, the anti-whitened data block may for instance completely fill a payload section of the PDU.

In an exemplary embodiment of the first aspect of the present invention, the specific data block is designed to be used by a receiver of the whitened data block to estimate a direction towards a transmitter of the whitened data block based on a received representation of the specific data block. Since, due to the anti-whitening, the specific properties of the specific data block are preserved although whitening of the data block that is to be whitened takes place prior to transmission, the specific data block may be specifically designed to allow direction estimation at the receiver. The design of the specific data block may for instance depend on whether single-channel and/or multi-channel transmitters and/or receivers are used.

In this exemplary embodiment, the received representation of the specific data block may be affected by at least one of switching through antennas of a single-channel multi-antenna transmitter during a transmission of the specific data block and switching through antennas of a single-channel multi-antenna receiver during a reception of the specific data block. A single-channel multi-antenna transmitter may for instance be a transmitter that is only capable of transmitting one signal at a time, but from different antennas, wherein a single-channel multi-antenna receiver may for instance be a receiver that is only capable of receiving one signal at a time, but from different receive antennas. The single-channel multi-antenna transmitter may for instance be comprised in the first or second apparatus according to the first aspect of the present invention.

In this exemplary embodiment, it may for instance be advantageous to use a specific data block that comprises one or more longer trains of "zero" bits or one or more trains of "one" bits so that—at least for specific periods of time—modulation-dependent signal characteristics of a received representation of the specific data block remain constant (for instance the frequency remains constant in case of GMSK modulation) and direction estimation based on this received representation of the specific data block is simplified. In this direction estimation, changes in the phases and/or amplitudes of the received representation of the specific data block can be accounted to different signal propagation delays from the one or more transmitter antennas to the one or more receiver antennas through which it is switched during transmission and/or reception of the specific data block. The changes in phases and/or amplitudes may also depend on the antennas themselves and/or their orientation (for instance in case of directional antennas).

In an exemplary embodiment of the first apparatus according to the first aspect of the present invention, the first apparatus further comprises means for anti-whitening the specific data block to obtain the anti-whitened data block. The means may for instance comprise a processor that is configured to perform the anti-whitening. The first apparatus then may for instance further comprise means for receiving or determining anti-whitening parameters that are required for performing the anti-whitening, for instance information on the initialization of a linear feedback shift register that may be used for the anti-whitening. Alternatively, the first apparatus according to the first aspect of the present invention may comprise means for receiving the anti-whitened data block, for instance from another apparatus. The means may for instance comprise an interface configured to receive the anti-whitened data block. Further alternatively, the first apparatus according to the first aspect of the present invention may comprise means for selecting the anti-whitened data block from a stored set of data blocks. The means may for instance comprise a processor configured to select the anti-whitened data block from a stored set of data blocks.

In an exemplary embodiment of the second apparatus according to the first aspect of the present invention, the second apparatus according to the first aspect of the present invention further comprises a processor configured to perform the anti-whitening on the specific data block to obtain the anti-whitened data block, or the processor configured to insert the anti-whitened data block into the data block to be whitened is further configured to perform the anti-whitening on the specific data block. A processor of the second apparatus then may for instance be configured to receive or determine anti-whitening parameters that are required for performing the anti-whitening, for instance information on the initialization of a linear feedback shift register that may be used for the anti-whitening. Alternatively, the second apparatus according to the first aspect of the present invention may comprise an interface configured to receive the anti-whitened data block, for instance from another apparatus. Further alternatively, the second apparatus according to the first aspect of the present invention may comprise a processor configured to select the anti-whitened data block from a stored set of data blocks.

In an exemplary embodiment of the method according to the first aspect of the present invention, the method further comprises anti-whitening the specific data block to obtain the anti-whitened data block. Alternatively, method may comprise receiving the anti-whitened data block, for instance from another apparatus. Further alternatively, the method may comprise selecting the anti-whitened data block from a stored set of data blocks.

In an exemplary embodiment of the first aspect of the present invention, the first apparatus according to the first aspect of the present invention further comprises means for whitening the data block that is to be whitened to obtain the whitened data block. The means may for instance comprise a processor configured to whiten the data block that is to be whitened. Alternatively, the first apparatus according to the first aspect of the present invention may comprise means for outputting the data block that is to be whitened, for instance to a further apparatus that is configured to perform the whitening on the data block that is to be whitened. The further apparatus may for instance be an apparatus that implements medium access control and/or BMC for a Bluetooth device.

In an exemplary embodiment of the second apparatus according to the first aspect of the present invention, the second apparatus according to the first aspect of the present invention further comprises a processor configured to whiten the data block that is to be whitened to obtain the whitened data block, or the processor configured to insert anti-whitened data block into the data block to be whitened is further configured to whiten the data block that is to be whitened. Alternatively, the second apparatus according to the first aspect of the present invention may comprise an interface configured to output the data block that is to be whitened, for instance to a further apparatus that is configured to perform the whitening on the data block that is to be whitened. The further apparatus may for instance be an apparatus that implements medium access control and/or BMC for a Bluetooth device.

In an exemplary embodiment of the method according to the present invention, the method further comprises whitening the data block that is to be whitened to obtain the whitened data block. Alternatively, the method may comprise outputting the data block that is to be whitened, for instance to a further apparatus that is configured to perform the whitening on the data block that is to be whitened. The further apparatus may for instance be an apparatus that implements medium access control and/or BMC for a Bluetooth device.

In an exemplary embodiment of the first aspect of the present invention, the data block that is to be whitened comprises information on the specific data block. The information may for instance comprise information on the length of the specific data block, the position of the specific data block and the contents of the specific data block. The information may for instance comprise one or more indices into one or more pre-defined tables that contain the information on the length and/or position and/or contents of the specific data block. The first apparatus according to the first aspect of the present invention may for instance comprise means for inserting the information into the data block that is to be whitened. The processor of the second apparatus according to the first aspect of the present invention may for instance be further configured to insert the information into the data block that is to be whitened. The method according to the first aspect of the present invention may for instance further comprise inserting the information into the data block that is to be whitened.

The information may for instance be exploited by a receiver of the whitened data block to locate a received representation of the specific data block in a received representation of the whitened data block, and/or to replace a received representation of the specific data block, which may be corrupted due to switching between antennas at a transmitter during transmission of the specific data block and/or at a receiver during reception of the specific data block, in the received representation of the whitened data block, for instance to allow error correction and/or detection with respect to at least a part of the whitened data block.

In an exemplary embodiment of the first aspect of the present invention, the anti-whitening and the whitening are based on linear feedback shift registers with the same length, feedback and initialization.

In an exemplary embodiment of the first aspect of the present invention, the first or second apparatus according to the first aspect of the present invention further comprise an antenna.

In an exemplary embodiment of the first aspect of the present invention, the first or second apparatus according to the first aspect of the present invention is a communication device that further comprises an antenna. The device may for instance be a Bluetooth device.

In an exemplary embodiment of the first aspect of the present invention, the method is performed by a communication device that further comprises an antenna. The device may for instance be a Bluetooth device.

The exemplary embodiments described above for the first aspect of the invention shall be understood to be disclosed in all possible combinations with each other.

Second Aspect of the Invention

According to a second aspect of the present invention, a first apparatus is disclosed, comprising means for receiving input data blocks; and means for outputting, in a first operating mode, an output data block generated by one of whitening and de-whitening an input data block in its entirety, and for outputting, in a second operating mode, one of: an output data block generated by one of whitening and de-whitening all parts of an input data block under exclusion of a specific data block contained in the input data block, so that the output data block comprises the specific data block in unchanged form, and an output data block that equals an input data block and comprises a specific data block comprised in the input data block.

The means for outputting the output data block may for instance comprise a processor that is configured to output the output data block. The processor may for instance be implemented in hardware alone, may have certain aspects in software alone, or may be a combination of hardware and software (e.g., at least one processor and at least one memory including program code). The means for receiving the input data block may for instance comprise an input.

According to a second aspect of the present invention, a second apparatus is disclosed, comprising an input configured to receive input data block; and a processor configured to output, in a first operating mode, an output data block generated by one of whitening and de-whitening an input data block in its entirety, and to output, in a second operating mode, one of: an output data block generated by one of whitening and de-whitening all parts of an input data block under exclusion of a specific data block comprised in the input data block, so that the output data block comprises the specific data block in unchanged form, and an output data block that equals an input data block and comprises a specific data block comprised in the input data block.

The processor may for instance be implemented in hardware alone, may have certain aspects in software alone, or may be a combination of hardware and software (e.g., at least one processor and at least one memory including program code).

According to the second aspect of the present invention, further a method is disclosed, comprising receiving input data blocks, and outputting, in a first operating mode, an output data block generated by one of whitening and de-whitening an input data block in its entirety, and outputting, in a second operating mode, one of an output data block generated by one of whitening and de-whitening all parts of an input data block under exclusion of a specific data block contained in the input data block, so that the output data block comprises the specific data block in unchanged form, and an output data block that equals an input data block and comprises a specific data block comprised in the input data block.

According to the second aspect of the present invention, further a program is disclosed, comprising program code for performing the method according to the second aspect of the present invention, when the program is executed on a processor. The program may for instance be distributed via a network, such as for instance the Internet. The program may for instance be stored on a readable-medium, for instance a computer-readable or processor-readable medium. The readable medium may for instance be embodied as an electric, magnetic, electro-magnetic, optic or other storage medium, and may either be a removable medium or a medium that is fixedly installed in an apparatus or device.

According to the second aspect of the present invention, further a readable storage medium encoded with instructions that, when executed by a processor, perform the method according to the second aspect of the present invention is disclosed. The readable storage medium may for instance be a computer-readable or processor-readable storage medium. It may be embodied as an electric, magnetic, electro-magnetic, optic or other storage medium, and may either be a removable storage medium or a storage medium that is fixedly installed in an apparatus or device.

According to the second aspect of the present invention, further a program is disclosed which causes a processor to receive input data blocks, and to output, in a first operating mode, an output data block generated by one of whitening and de-whitening an input data block in its entirety, and to output, in a second operating mode, one of: an output data block generated by one of whitening and de-whitening all parts of an input data block under exclusion of a specific data block contained in the input data block, so that the output data block comprises the specific data block in unchanged form, and an output data block that equals an input data block and comprises a specific data block comprised in the input data block. The program may for instance be stored on a readable medium, for instance a computer-readable or processor-readable medium. The readable medium may for instance be embodied as an electric, magnetic, electro-magnetic, optic or other storage medium, and may either be a removable medium or a medium that is fixedly installed in an apparatus or device.

According to the second aspect of the present invention, output data blocks are output in two different operating modes. In the first operating mode, the output data block is generated by whitening or de-whitening an input data block in its entirety.

In a first alternative of the second operating mode, the output data block is generated by whitening or de-whitening all parts of an input data block comprising a specific data block, under exclusion of the specific data block, so that the output data block comprises the specific data block in unchanged form. If the output data block is generated by whitening, the output data block then comprises the specific data block in non-whitened form, and the rest of the output data block then may be in whitened form. If the output data block is generated by de-whitening, the output data block then comprises the specific data block in non-de-whitened form, and the rest of the output data block then may be in de-whitened form.

In a second alternative of the second operating mode, the output data block equals an input data block, wherein the input data block comprises a specific data block.

The whitening may for instance be a transformation that makes a signal more similar to white noise, wherein white noise is understood as a signal with a flat power spectral density. The whitening may for instance be implemented by a linear feedback shift register. The de-whitening may for instance be a transformation that removes the effect of a whitening transformation. The de-whitening may for instance be implemented by a linear feedback shift register. This linear feedback shift register may be the same linear feedback shift register that is used for whitening the effects of which shall be removed by the de-whitening.

Both alternatives of the second operating mode have in common that whitening/de-whitening is not performed on at least the specific data block comprised in the input data block.

For instance, this may allow to exclude the specific data block from whitening and thus to preserve specific properties of the specific data block that would be amended or destroyed by the whitening. The specific properties of the specific block may for instance be the usability of the specific data block for direction estimation with a single-channel multi-antenna transmitter and/or receiver.

Excluding at least the specific data block from de-whitening may for instance be advantageous if the specific data block has also not been subject to a whitening operation. It may for instance be the case that a whitening operation is to be performed on an input data block under exclusion of at least the specific data block, for instance at a transmitter. At a receiver, it may then make sense to exclude the specific data block also from de-whitening.

In an exemplary embodiment of the first and second apparatus according to second aspect of the present invention, the first apparatus and the second apparatus are controllable to switch between the first operating mode and the second operating mode. The control may for instance be based on whether the input data block comprises the specific data block or not.

In an exemplary embodiment of the first apparatus according to the second aspect of the present invention, the first apparatus further comprises means for controlling a switching between the first operating mode and the second operating mode. The controlling may for instance be based on whether the input data block comprises the specific data block or not.

In an exemplary embodiment of the second apparatus according to second aspect of the present invention, the processor is further configured to control a switching between the first operating mode and the second operating mode. The control may for instance be based on whether the input data block comprises the specific data block or not.

In an exemplary embodiment of the method according to second aspect of the present invention, the method further comprises controlling a switching between the first operating mode and the second operating mode. The controlling may for instance be based on whether the input data block comprises the specific data block or not.

In an exemplary embodiment of the second aspect of the present invention, the first or second apparatus according to the second aspect of the present invention implements a MAC and/or BMC of a Bluetooth device. The first or second apparatus according to the second aspect of the present invention may for instance be a MAC and/or BMC processor of a Bluetooth device or a part of such a MAC and/or BMC processor. The first or second apparatus according to the second aspect of the present invention may also be a module to be used in a Bluetooth device or to be used in a part thereof.

With respect to a transmitter site, the first or second apparatus according to the second aspect of the present invention may then be capable of switching between two operating modes: in the first operating mode, input data blocks that may for instance be received from a host processor are whitened, whereas in a second operating mode, input data blocks that comprise a specific data block, for instance a data block that is suited to be exploited—in non-whitened form—by a receiver for direction estimation, are either only whitened under exclusion of the specific data block, or are not whitened at all.

With respect to a receiver site, the first or second apparatus according to the second aspect of the present invention may then be capable of switching between two operating modes: in the first operating mode, input data blocks that may for instance be received from a baseband layer are de-whitened, whereas in a second operating mode, input data blocks that comprise a specific data block, for instance a data block that is suited to be exploited by the receiver for direction estimation and thus has not been whitened at a transmitter, are either only de-whitened under exclusion of the specific data block, or are not de-whitened at all.

In an exemplary embodiment of the second aspect of the present invention, the input block may comprise a Protocol Data Unit (PDU) part and a Cyclic Redundancy Check (CRC) part of a Bluetooth packet, for instance an advertisement or data packet. In the first operating mode, the input data block may then be whitened/de-whitened as a whole, whereas in the second operating mode, the specific data block may for instance be comprised in at least a part of the payload section of the PDU, and then the input data block may only be whitened/de-whitened under exclusion of the specific part, or may not be whitened/de-whitened at all.

In an exemplary embodiment of the second aspect of the present invention, the specific data block is designed to be used by a receiver of the output data block to estimate a direction towards a transmitter of the output data block based on a received representation of the specific data block. Since in the second operating mode, for instance transmitter-site whitening may not be performed at least for the specific data block, the specific properties of the specific data block are preserved. The specific data block thus may be specifically designed to allow direction estimation at the receiver. The design of the specific data block may for instance depend on whether single-channel and/or multi-channel transmitters and/or receivers are used.

In this exemplary embodiment, the received representation of the specific data block is affected by at least one of switching through antennas of a single-channel multi-antenna transmitter during a transmission of the specific data block and switching through antennas of a single-channel multi-antenna receiver during a reception of the specific data block. A single-channel multi-antenna transmitter may for instance be a transmitter that is only capable of transmitting one signal at a time, but from different antennas, wherein a single-channel multi-antenna receiver may for instance be a receiver that is only capable of receiving one signal at a time, but from different receive antennas. The single-channel multi-antenna transmitter may for instance be comprised in the first or second apparatus according to the second aspect of the present invention.

In this exemplary embodiment, it may for instance be advantageous to use a specific data block that comprises one or more longer trains of "zero" bits or one or more trains of "one" bits so that—at least for specific periods of time—modulation-dependent signal characteristics of a received representation of the specific data block remains constant (for instance the frequency remains constant in case of GMSK modulation) and direction estimation based on this received representation of the specific data block is simplified. In this direction estimation, changes in the phases and/or amplitudes of the received representation of the specific data block can be accounted to different signal propagation delays from the one or more transmitter antennas to the one or more receiver antennas through which it is switched during transmission and/or reception of the specific data block. The changes in phases and/or amplitudes may also depend on the antennas themselves and/or their orientation (for instance in case of directional antennas).

In an exemplary embodiment of the second aspect of the present invention, the input data block in the second operating mode comprises information on the specific data block. The information may for instance comprise information on the length of the specific data block, the position of the specific data block (in the input data block) and the contents of the specific data block. The information may for instance comprise one or more indices into one or more pre-defined tables that contain the information on the length and/or position and/or contents of the specific data block.

The information may for instance be exploited by a receiver of the output data block to locate a received representation of the specific data block in a received representation of the output data block, and/or to replace the received representation of the specific data block, which may be corrupted due to switching between antennas at a transmitter during transmission of the specific data block and/or at a receiver during reception of the specific data block, in the received representation of the output data block, for instance to allow error correction and/or detection with respect to at least a part of the output data block.

In an exemplary embodiment of the second aspect of the present invention, the first or second apparatus according to the second aspect of the present invention further comprise an antenna.

In an exemplary embodiment of the second aspect of the present invention, the first or second apparatus according to the second aspect of the present invention is a communication device that further comprises an antenna. The device may for instance be a Bluetooth device.

The exemplary embodiments described above for the second aspect of the invention shall be understood to be disclosed in all possible combinations with each other.

Third Aspect of the Invention

According to a third aspect of the present invention, a first apparatus is disclosed, comprising means for receiving an input data block; means for replacing a specific data block that is contained in the input data block by a replacement data block to obtain an output data block, wherein the replacement accounts for a switching between antennas during at least one of a transmission with a single-channel transmitter and a reception with a single-channel receiver of a data block that is related to the specific data block, and means for outputting the output data block.

The means for replacing the output data block may for instance comprise a processor that is configured to replace the specific data block by a replacement data block. The processor may for instance be implemented in hardware alone, may have certain aspects in software alone, or may be a combination of hardware and software (e.g., at least one processor and at least one memory including program code). The means for receiving the input data block and the means for outputting the output data block may for instance comprise an input and an output, respectively.

According to a third aspect of the present invention, a second apparatus is disclosed, comprising an input configured to receive an input data block; a processor configured to replace a specific data block that is contained in the input data block by a replacement data block to obtain an output data block, wherein the replacement accounts for a switching between antennas during at least one of a transmission with a single-channel transmitter and a reception with a single-channel receiver of a data block that is related to the specific data block, and an output configured to output the output data block.

The processor may for instance be implemented in hardware alone, may have certain aspects in software alone, or may be a combination of hardware and software (e.g., at least one processor and at least one memory including program code).

According to the third aspect of the present invention, further a method is disclosed, comprising receiving an input data block; replacing a specific data block that is contained in the input data block by a replacement data block to obtain an output data block, wherein the replacement accounts for a switching between antennas during at least one of a transmission with a single-channel transmitter and a reception with a single-channel receiver of a data block that is related to the specific data block, and outputting the output data block.

According to the third aspect of the present invention, further a program is disclosed, comprising program code for performing the method according to the third aspect of the present invention, when the program is executed on a processor. The program may for instance be distributed via a network, such as for instance the Internet. The program may for instance be stored on a readable-medium, for instance a computer-readable or processor-readable medium. The readable medium may for instance be embodied as an electric, magnetic, electro-magnetic, optic or other storage medium, and may either be a removable medium or a medium that is fixedly installed in an apparatus or device.

According to the third aspect of the present invention, further a readable storage medium encoded with instructions that, when executed by a processor, perform the method according to the third aspect of the present invention is disclosed. The readable storage medium may for instance be a computer-readable or processor-readable storage medium. It may be embodied as an electric, magnetic, electro-magnetic, optic or other storage medium, and may either be a removable storage medium or a storage medium that is fixedly installed in an apparatus or device.

According to the third aspect of the present invention, further a program is disclosed which causes a processor to receive an input data block; to replace a specific data block that is contained in the input data block by a replacement data block to obtain an output data block, wherein the replacement accounts for a switching between antennas during at least one of a transmission with a single-channel transmitter and a reception with a single-channel receiver of a data block that is related to the specific data block; and to output the output data block.

The program may for instance be stored on a readable medium, for instance a computer-readable or processor-readable medium. The readable medium may for instance be embodied as an electric, magnetic, electro-magnetic, optic or other storage medium, and may either be a removable medium or a medium that is fixedly installed in an apparatus or device.

According to the third aspect of the present invention, an input data block is received, which comprises a specific data block. The specific data block is replaced by a replacement data block to account for a switching between antennas during a transmission of a data block with a single-channel transmitter and/or a reception of a data block with a single-channel receiver, the data block being related to the specific data block. The replacement of the specific data block in the input data block yields an output data block that is output.

A single-channel transmitter with multiple antennas may for instance be a transmitter that is only capable of transmitting one signal at a time, but from different antennas, wherein a single-channel receiver with multiple antennas may for instance be a receiver that is only capable of receiving one signal at a time, but from different receive antennas. The single-channel receiver with multiple antennas may for instance be comprised in the first or second apparatus according to the third aspect of the present invention.

The data block may for instance be related to the specific data block in that the specific data block is a received representation of the data block. The specific data block may for instance be corrupted due to the switching between antennas during a transmission of the data block with a single-channel transmitter and/or due to the switching between antennas during a reception of the data block with a single-channel receiver.

The replacement data block may for instance at least substantially correspond to the data block that is related to the specific data block.

In an exemplary embodiment of the third aspect of the present invention, the first or second apparatus according to the second aspect of the present invention implements a part of a Bluetooth device. The first or second apparatus according to the third aspect of the present invention may also be a module to be used in a Bluetooth device or to be used in a part thereof.

In an exemplary embodiment of the third aspect of the present invention, the input block may be a received representation of a Protocol Data Unit (PDU) part and a Cyclic Redundancy Check (CRC) part of a Bluetooth packet, for instance of an advertisement or data packet. The specific data block then may for instance be a received representation of a part of a payload section of the PDU, for instance a part of the payload section that comprises a bit sequence that is particularly suited for direction estimation in the context of single-channel multi-antenna transmission and/or reception. The replacement data block then may for instance correspond to this bit sequence.

In an exemplary embodiment of the third aspect of the present invention, the data block that is related to the specific data block allows a receiver of a representation of the specific data block to estimate a direction towards a transmitter of the data block that is related to the specific data block based on the received representation of the specific data block. The data that is related to the specific data block thus may be specifically designed to allow direction estimation at the receiver. The design of the data that is related to the specific data block may for instance depend on whether single-channel and/or multi-channel transmitters and/or receivers are used.

In this exemplary embodiment, it may for instance be advantageous to use—as a data block that is related to the specific data block—a data block that comprises one or more longer trains of "zero" bits or one or more trains of "one" bits so that—at least for specific periods of time—modulation-dependent signal characteristics of a received representation of the data block that is related to the specific data block remains constant (for instance the frequency remains constant in case of GMSK modulation) and direction estimation based on this received representation is simplified.

In this direction estimation, changes in the phases and/or amplitudes of the received representation of the data block that is related to the specific data block can be accounted to different signal propagation delays from the one or more transmitter antennas to the one or more receiver antennas through which it is switched during transmission and/or reception of the data block that is related to the specific data block. The changes in phases and/or amplitudes may also depend on the antennas themselves and/or their orientation (for instance in case of directional antennas).

In an exemplary embodiment of the third aspect of the present invention, a part of the input data block that is not replaced comprises information on the data block that is related to the specific data block. The information may for instance comprise information on the length of the data block, the position of the data block and the contents of the data block. The information may for instance comprise one or more indices into one or more pre-defined tables that contain the information on the length and/or position and/or contents of the data block.

The information may for instance be exploited to locate the specific data block in the input data block, and/or to replace the specific data block, which maybe corrupted due to switching between antennas at a transmitter during transmission of the data block that is related to the specific data block and/or at a receiver during reception of the data block that is related to the specific data block, in the input data block, for instance to allow error correction and/or detection with respect to at least a part of a data block that is related to the input data block.

In an exemplary embodiment of the third aspect of the present invention, at least a part of the input data block that it not replaced and at least a part of the replacement data block have to be jointly processed to allow for at least one of error detection and correction of at least a part of the input data block. The part of the input data block that is not replaced and the replacement data block may for instance both be required to evaluate a checksum of a cyclic redundancy code.

In an exemplary embodiment of the third aspect of the present invention, the first or second apparatus according to the third aspect of the present invention further comprise an antenna.

In an exemplary embodiment of the third aspect of the present invention, the first or second apparatus according to the third aspect of the present invention is a communication device that further comprises an antenna. The communication device may for instance be a Bluetooth device.

In an exemplary embodiment of the third aspect of the present invention, the method according to the third aspect of the present invention is implemented by a communication device that comprises an antenna. The communication device may for instance be a Bluetooth device.

The exemplary embodiments described above for the third aspect of the invention shall be understood to be disclosed in all possible combinations with each other.

It is to be noted that the above description of embodiments of the present invention is to be understood to be merely exemplary and non-limiting.

These and further aspects of the invention will be apparent from and elucidated with reference to the detailed description presented hereinafter.

BRIEF DESCRIPTION OF THE FIGURES

In the figures show:

FIG. 4*a*: a schematic illustration of functional units implemented by exemplary embodiments of apparatuses according to the first aspect of the present invention;

FIG. 4*b*: a schematic illustration of functional units implemented by exemplary embodiments of apparatuses according to the second aspect of the present invention;

DETAILED DESCRIPTION OF EXEMPLARY EMBODIMENTS OF THE INVENTION

In the following detailed description, exemplary embodiments of the present invention will be described in the context of a Bluetooth system. It is however emphasized that deployment of the present invention in this type of system is of exemplary nature only, since the present invention is equally well applicable to various other radio systems.

Figure 1:
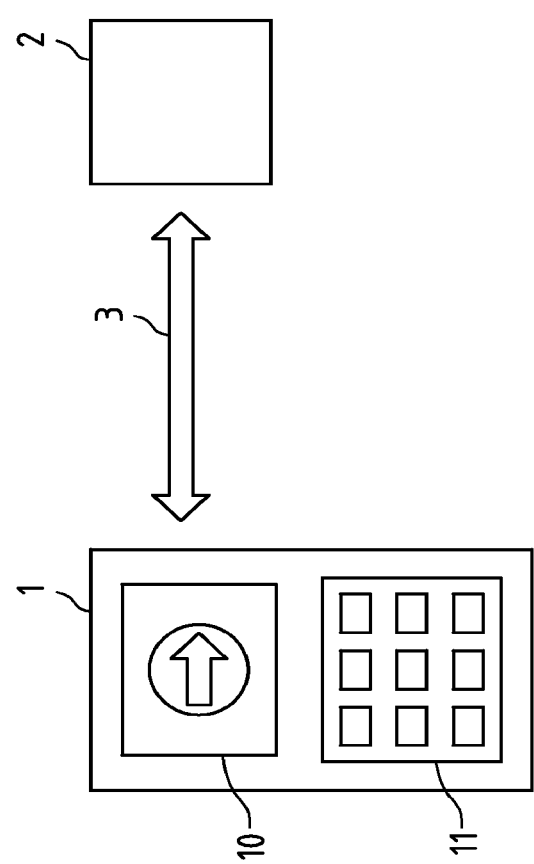
FIG. 1: A schematic illustration of two exemplary embodiments of apparatuses according to the present invention.

FIG. 1 schematically illustrates two exemplary embodiments of apparatuses according to the present invention. Apparatus 1 is exemplarily chosen to be a mobile phone that is equipped with a display 10 and a keypad 11. Apparatus 1 is configured to estimate the direction (and optionally also the distance) towards other devices. Apparatus 2 is an apparatus that is configured to communicate with apparatus 1, as illustrated by arrow 3.

It may for instance be a "public" device, which may act as a slave that advertises on a regular time interval. Such "public" devices may be locatable by authorized and non-authorized devices. For advertising, a packet format as described with reference to FIG. 2 below is used. Apparatus 2 may then for instance be used in the following applications: positioning, gaming, context awareness and further applications.

Apparatus 2 may alternatively be a "private" device, which may act as slave scanning for authorized (paired) devices, i.e. it does not transmit until requested by an authorized device. "Private" devices may only be locatable by authorized devices and only after connection setup, i.e. when frequency channels and packet format have been agreed upon. Apparatus 2 may then for instance be used to find objects such as keys, pets or other objects. For such applications, it may not be necessary to equip apparatus 2 with a display and/or a keypad.

Apparatus 1 and apparatus 2 may for instance be capable of operating according to the Bluetooth (BT) standard or a derivative thereof, for instance according to a low energy mode of the BT standard.

As schematically illustrated in FIG. 1, apparatus 1 has estimated a direction towards apparatus 2 and indicates this direction via an arrow on display 10. Optionally, furthermore a distance to apparatus 2 may be estimated and displayed on display 2.

When performing direction estimation/tracking and positioning (for instance local/indoor positioning), usually an antenna array consisting of at least two non-co-located antennas has to be deployed at the transmitter or the receiver. For instance, if an antenna array is deployed at the receiver, the different signal propagation delays (which cause different receive signal phases and amplitudes) between a transmit antenna and the at least two antennas of the antenna array of the receiver allow to estimate a direction towards the transmitter (which estimated direction may however be ambiguous and, depending on the number of antennas in the antenna array, rather coarse). This approach is also known as "beamforming", because an antenna array can be controlled to have a beam-shaped direction-sensitive reception sensitivity that is exploited for direction estimation. Algorithms for estimating a direction of arrival based on a set of receive signals received with an antenna array of known aperture are well known in the art. Well-established examples of such algorithms are the so-called MUSIC algorithm, as described in reference "Multiple Emitter Location and Signal Parameter Estimation" by R. O. Schmidt, IEEE Transactions on Antennas and Propagation, vol. 34, no. 3, pages 276-280, March 1986, and the so-called ESPRIT algorithm, as described in reference "ESPRIT—Estimation of signal parameters via rotational invariance techniques" by R. Roy and T. Kailath, IEEE Transactions on Acoustics, Speech and Signal Processing, vol. 37, no. 7, pp. 984-995, July 1989.

As already stated above, when direction estimation is performed based on beamforming with an antenna array, the phase difference (as well as the amplitude difference) between the signals received by the antennas of the antenna array is measured (for instance the phase and/or amplitude differences between signals received at antennas 2 to N with respect to a signal received at antenna 1, which serves as a reference antenna in an N-element antenna array). It may be desirable that the signal for direction estimation is a normal data packet (such as for instance a Wireless Local Area Network (WLAN) packet, a BT packet, or any other data packet), so that no special type of data packet has to be introduced to allow direction estimation.

In many wireless radio systems, a whitening process used to make the transmitted signal more noise like, for instance by making the signal so that long sequences of "0" or "1" are not present.

However, when beamforming is performed based on a single-channel receiver, i.e. when a receiver has an antenna array with multiple antennas, but only one Radio Frequency (RF) reception chain (channel), so that only a signal received at one of the antennas can be processed at a time, requiring a switching between the antennas if the direction sensitivity of the antenna array shall be exploited, a transmitted signal with long sequences of "0"s or "1"s may be desired, because during such long sequences, the modulation-dependent signal characteristics of the transmitted signal (for instance the frequency in case of frequency modulation (such as GMSK), or the phase in phase modulation (such as Binary Phase Shift Keying (BPSK), Quaternary Phase Shift Keying (QPSK), etc.), or the amplitude in amplitude modulation, or both phase and amplitude in Quadrature Amplitude Modulation (QAM)) remain constant and—consequently—the estimation of the phase differences between the signals received at the multiple antennas is simplified.

Figure 6A:
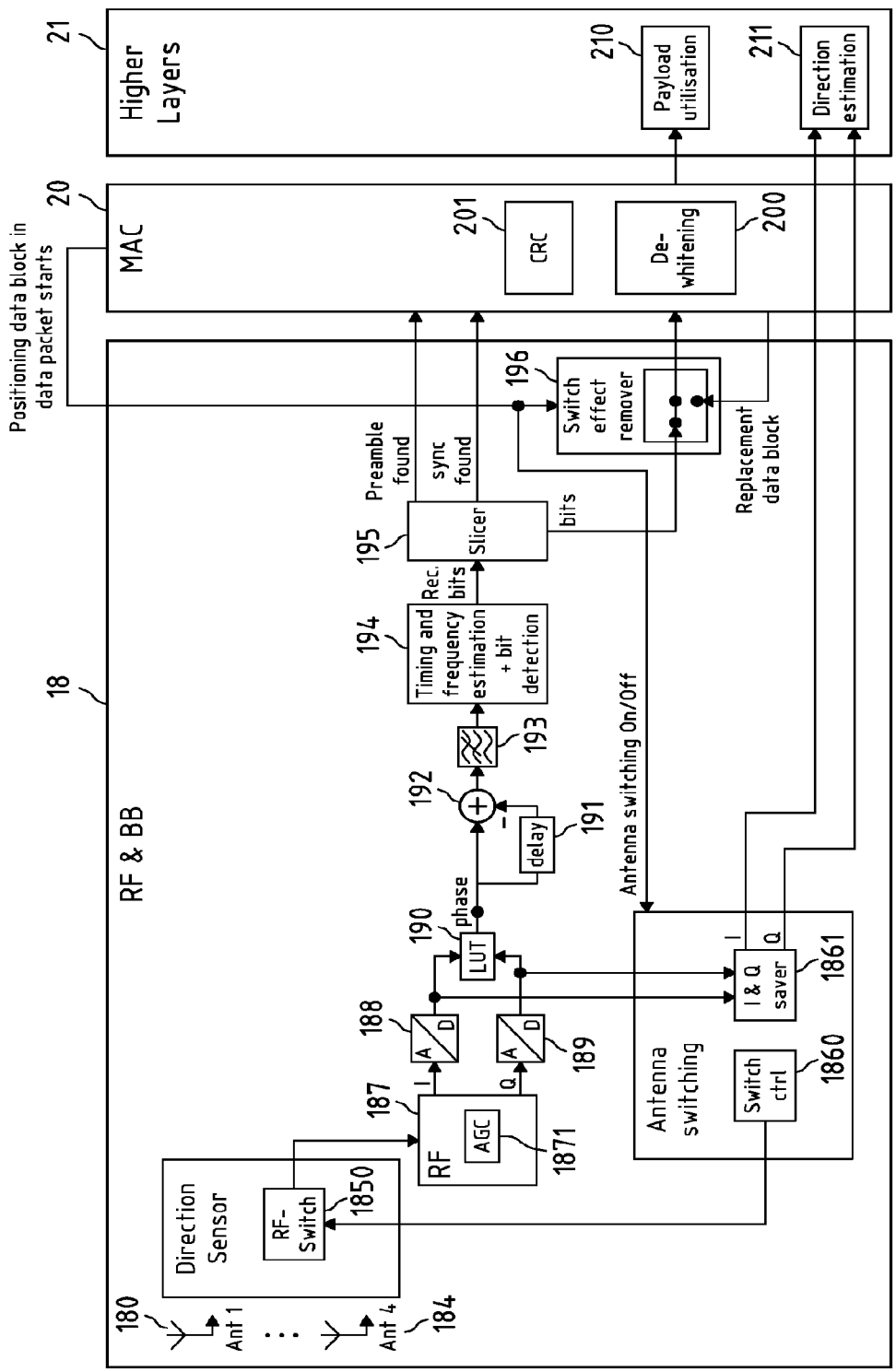
FIG. 6a: a schematic illustration of functional units implemented by exemplary embodiments of apparatuses according to the third aspect of the present invention.
Figure 6B:
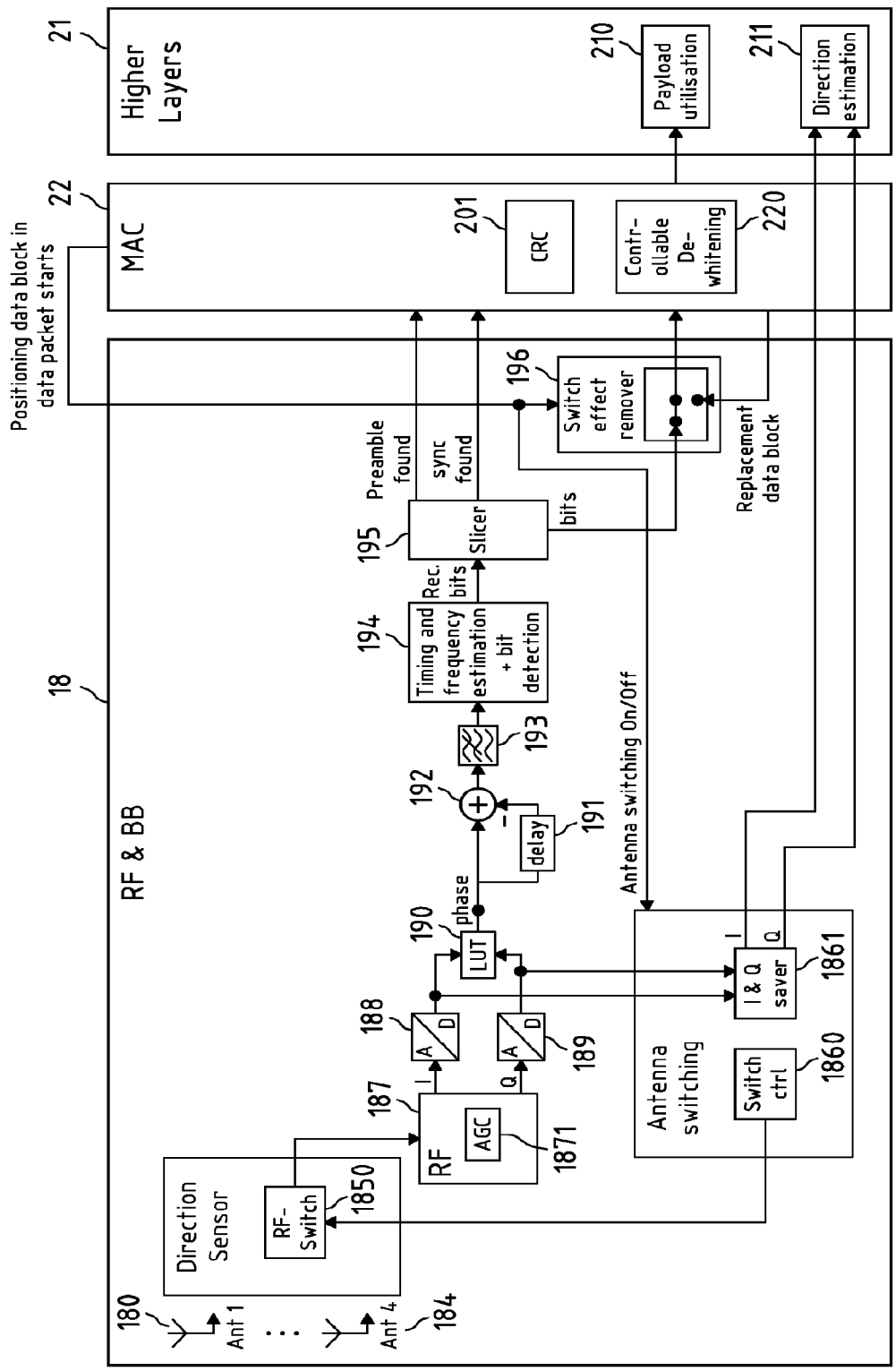
FIG. 6b: a schematic illustration of functional units implemented by further exemplary embodiments of apparatuses according to the second and third aspect of the present invention.

Therein, the minimum required length of the runs of equal bits in the transmitted signal depends inter alia on the switching time of the RF switch in the transmitter or receiver (see for instance RF switch 1850 in FIGS. 6*a* and 6*b*). If the switching time is significantly below the bit duration, it may be possible to measure a phase difference between two or more antennas during the reception of a single bit, if switching is exemplarily performed at the receiver.

However, this is usually not the case because the relatively low switching time of the RF switch (for instance in the range of 100 ns) and the bandwidth of the receiver require the guard time between measuring two antennas to be so long that one bit is not enough.

Therein, it should be noted that it may be sufficient to determine phase and/or amplitude differences between pairs of antennas, wherein each pair of antennas comprises the same reference antenna and another antenna with respectively increasing index. For instance, if phase and/or amplitude differences between four antennas shall be determined, the first antenna may be considered as the reference antenna, and the following three phase and/or amplitude differences then may be determined: reference antenna→antenna 2, reference antenna→antenna 3, reference antenna→antenna 3.

It may then be sufficient to ensure that a respective run of "0"s or "1"s in the transmitted signal is long enough to allow the determining of the phase and/or amplitude difference between two antennas (the reference antenna and another antenna) during its reception. For instance, if the transmitted signal comprises the following sequence: "0000 1111 0000 . . . ", and if four antennas are used for switching (for instance at the receiver), during reception of the first four "0"s, the phase difference between the reference antenna and the second antenna may be determined, during reception of the next four "1"s, the phase difference between the reference antenna and the third antenna may be determined, and during the next four "0"s, the phase difference between the reference antenna and the fourth antenna may be determined.

Therein, it should be noted that the actual bits contained in the transmitted signal do not necessarily have to be known at the receiver to enable the receiver to perform direction estimation, as long as the receiver knows when to expect the runs of "0"s or "1"s (i.e. the runs of equal bits). This is due to the fact that direction estimation may be performed based on phase and/or amplitude differences of signals received at or transmitted from different antenna elements only.

The first aspect of the present invention offers a possibility to maintain long sequences of "0" or "1" (or any other sequence suited for direction estimation with a single-channel multi-antenna transmitter or receiver) in at least a part of the transmitted data packet by introducing an anti-whitening block in the transmitter, so that the data packet may be easily used in direction estimation. The anti-whitening block may for instance be implemented in software so that no hardware modifications may be needed in the transmitter. During transmission of the sequence, the system switches through the different antennas (either in the single-channel multi-antenna receiver, as described above, or in the single-channel multi-antenna transmitter, if the transmitter is equipped with an antenna array instead of the receiver), which switching causes phase and/or amplitude changes to the received signal that may be exploited for direction estimation.

The second aspect of the present invention offers an alternative possibility to maintain these long sequences of "0" or "1" (or any other sequence suited for direction estimation with a single-channel multi-antenna transmitter or receiver) in at least apart of the transmitted data packet by excluding at least these sequences from whitening. This can for instance be achieved by whitening the data packet that contains such a sequence under exclusion of this sequence, or by performing no whitening at all on data packets that contain such a sequence.

Another problem when performing single-channel beamforming during packet transmission or reception is that the received data will be corrupted during antenna switching. Exemplary embodiments of the third aspect of the present invention therefore foresee a removal of switch effects in the receiver which allows transparent antenna switching during data packet reception.

Figure 2:
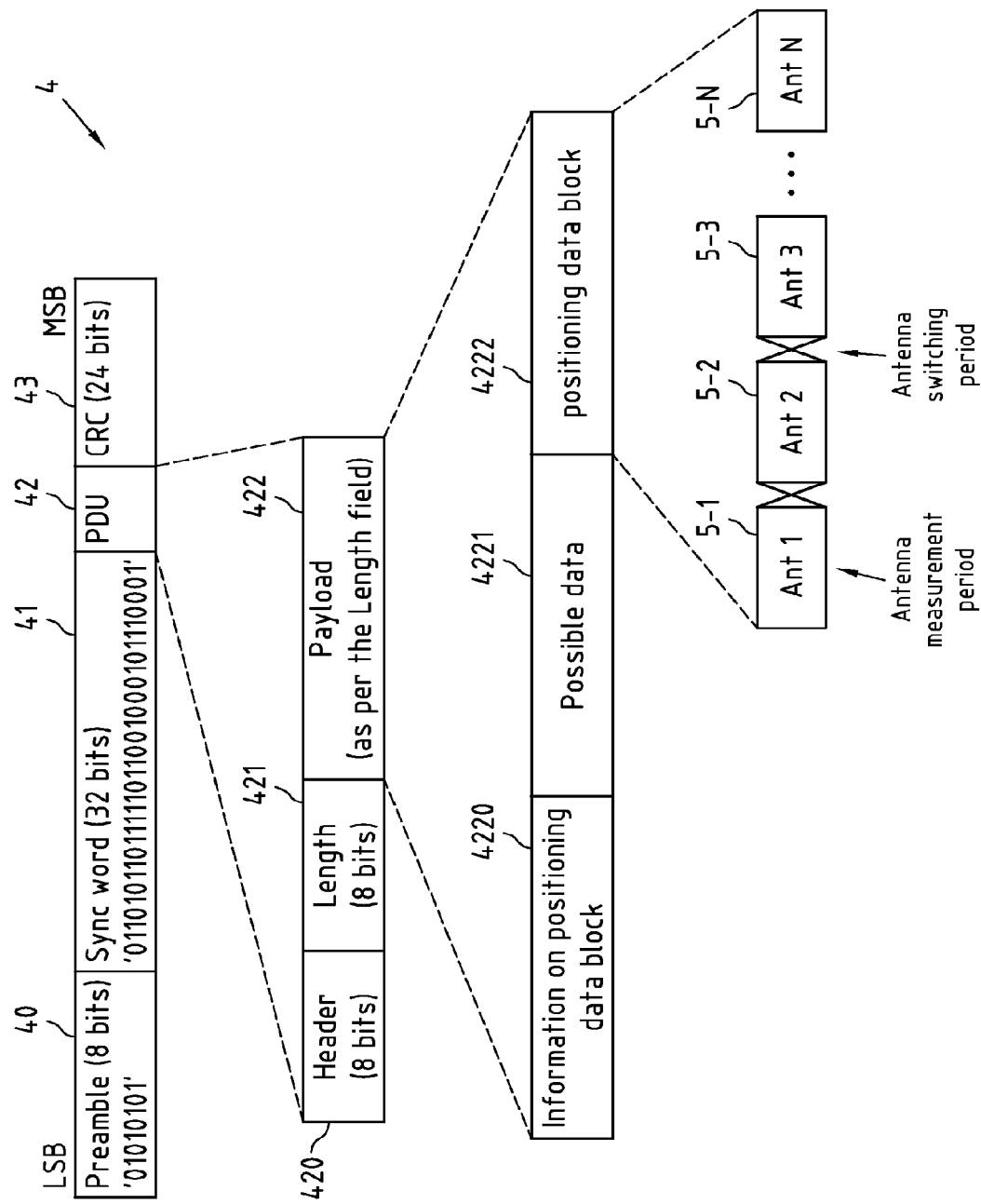
FIG. 2: a schematic illustration of an exemplary embodiment of a data packet with a positioning field for direction estimation according to the present invention.

FIG. 2 is a schematic illustration of an exemplary embodiment of a data packet 4 with a positioning field 4222 for direction estimation according to the present invention. Data packet 4 may for instance be a BT advertisement packet or a BT data packet. Data packet 4 comprises the following data blocks: a preamble 40, a synchronization word 41, a Protocol Data Unit (PDU) 42 and a Cyclic Redundancy Check (CRC) data block 43. PDU data block 42 comprises in turn a header section 420, a length indicator 421, and a payload data block 422 with a length as indicated by length indicator 421. Therein, PDU data block 42 and CRC data block 43 are subject to a whitening operation prior to transmission of data packet 4.

Payload data block 422 comprises a data field 4221 for actual payload data (e.g. data of higher protocol layers), a positioning data block 4222 and information 4220 on the positioning data block 4222. This information 4222 on the positioning data block 4222 may for instance equally well be contained in the header section 420 of PDU data block 42 instead.

The positioning data block 4222 is inserted into the payload section of PDU data block 42 to allow a receiver of data packet (and thus of positioning data block 4222) to estimate a direction towards the transmitter of data packet 4. With respect to FIG. 1, data packet 4 thus may be transmitted by apparatus 2 to enable apparatus 1 to estimate a direction towards apparatus 2. To this end, apparatus 1 may be equipped with a multi-antenna array with N antennas and with a single-channel receiver, so that, during reception of a positioning data block 4222, a switching between the N antennas is performed as illustrated in FIG. 2 by time periods 5-1, 5-2, 5-3 and 5-N and interposed antenna switching periods. During each of these time periods, only one of the N antennas is connected to the single receive channel of apparatus 1, i.e. only the signal received at one antenna is processed by apparatus 1 (for instance antenna 1 in time period 5-1, antenna 2 in time period 5-2, etc.). However, since apparatus 1 nevertheless receives signals transmitted from apparatus 2 to its N antennas (only in different time periods 5-1, 5-2, etc.), a direction towards apparatus 2 can be estimated. The sequence in which the antennas in FIG. 2 are cycled through may for instance be suited when the positioning data block 4222 comprises one or more runs of "0"s or "1"s (i.e. equal bits) with a respective length that allows all antennas to be switched through during one of these one or more runs.

As an alternative to the sequential switching through the antennas 1 to N as illustrated in FIG. 2, equally well a back-and-forth switching between antennas 2 to N and antenna 1, which serves as a reference antenna, may be performed, leading to the following exemplary sequence of antenna measurement periods: Ant 1, Ant 2, Ant 1, Ant 3, Ant 1, Ant 4, etc. This sequence may for instance be suited when the respective length of the one or more runs of "0"s or "1"s (i.e. equal bits) in the positioning data block 4222 allows only a switching between two antennas during one of these one or more runs.

Depending on the use case, positioning data block 4222 may for instance comprise 8-144 bits. If no actual data is contained in PDU 42 in addition to the contents of the positioning data block 4222, CRC data block 43 may be ignored by a receiver.

According to an exemplary embodiment of the first aspect of the present invention, the positioning data block 4222 in PDU data block 42 of data packet 4 is an anti-whitened data block that is obtained by performing anti-whitening on a positioning sequence, i.e. on a sequence that for instance contains long runs of "0" or long runs of "1" or any other sequence that is suited to allow direction estimation at a single-channel multi-antenna receiver. Since the PDU data block 42 and the CRC data block 43 of data packet 4 are subject to whitening prior to transmission, the anti-whitening of the positioning sequence, which yields the anti-whitened data block that is inserted into PDU data block 42 as positioning data block 4222, has the effect that the positioning sequence is transmitted in non-whitened form, whereas the rest of PDU data block 42 and CRC data block 43 are transmitted in whitened form. The information 4220 on the positioning data block 4222 then indicates a length of the positioning data block 4222, a location of the positioning data block 4222 (e.g. within payload data block 422) and information on the positioning sequence, for instance a copy thereof. Some or all of this information may not be contained in the information 4220, for instance because a length and/or a position and/or a content of the positioning data block 4222 is pre-defined or otherwise known to the receiver. The length and/or position information and/or the information on the positioning sequence may also be conveyed via an index into a table. It may thus be possible that payload data block 422 or PDU 42 do not contain any information on the positioning data block at all. It may then be otherwise indicated to a receiver that data packet 4 contains a positioning data block 4222, for instance by a pre-defined interval at which positioning data blocks are inserted into data packets 4.

According to an exemplary embodiment of the second aspect of the present invention, the positioning data block 4222 in PDU data block 42 of data packet 4 is a positioning sequence, i.e. a sequence that for instance contains long runs of "0" or long runs of "1" or any other sequence that is suited to allow direction estimation at a single-channel multi-antenna receiver. No anti-whitening is performed here, since according to the second aspect of the invention, at least positioning data block 4222, or even the entire PDU data block 42 and the CRC data block 43 of data packet 4, are not whitened at all. The position sequence contained in the positioning data block 4222 is thus transmitted in non-whitened form, when data packet 4 is transmitted. The information 4220 on the positioning data block 4222 then indicates a length of the positioning data block 4222, a location of the positioning data block 4222 (e.g. within payload data block 422) and information on the positioning sequence, for instance a copy thereof. The description of the alternative forms and extent in which the information 4220 on the positioning data block 4222 may be contained in the data packet 4, including the case where no information 4220 is contained in data packet 4 at all, also applies to this exemplary embodiment of the second aspect of the present invention.

Figure 3B:
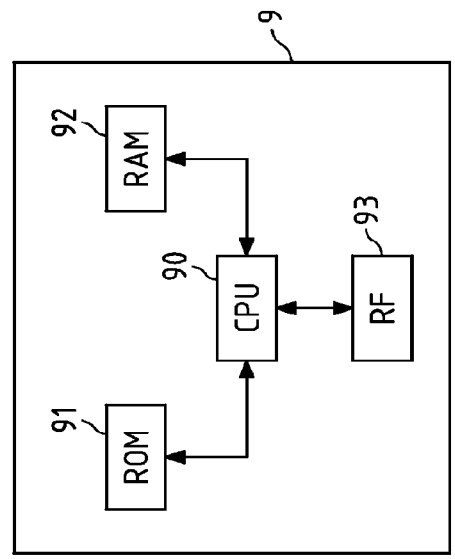
FIG. 3*b*: a schematic illustration of components of a further exemplary embodiment of an apparatus according to the present invention.
Figure 3A:
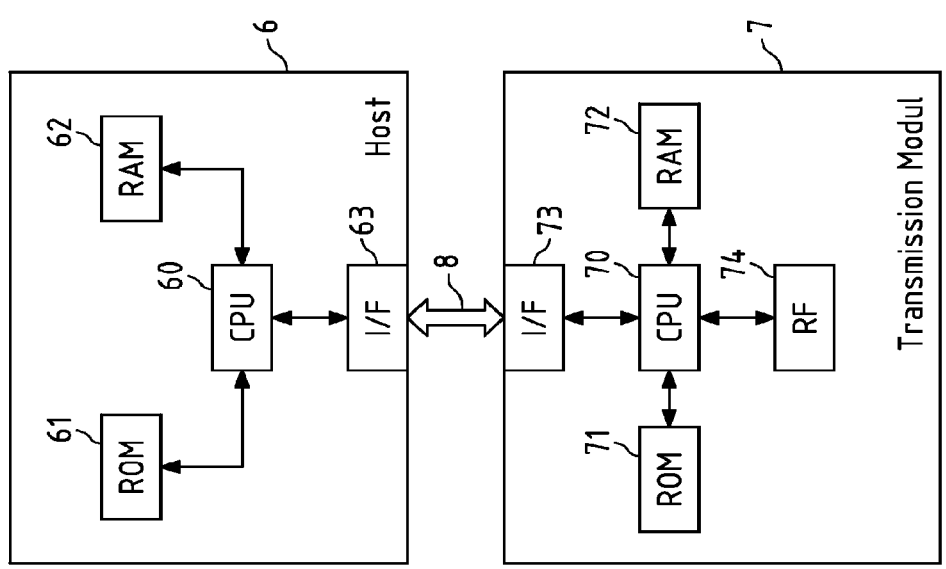
FIG. 3*a*: a schematic illustration of components of an exemplary embodiment of apparatuses according to the present invention.

FIG. 3a schematically illustrates components of an exemplary embodiment of apparatuses according to the present invention. Host 6 of FIG. 3a may for instance be considered as an exemplary embodiment of the first aspect of the present invention. Transmission module 7 may for instance be considered as an exemplary embodiment of the second or third aspect of the present invention. Host 6 and transmission module 7 may for instance be comprised in apparatuses 1 and 2 of FIG. 1.

In the context of a BT system, host 6 can be considered as a host processor, and transmission module 7 can be considered as a BT module (also known as BT controller). Host processor 6 and BT module 7 communicate according to the standardized Host Controller Interface (HCI) 8. BT module 7 implements the lower layers of the BT protocol stack (for instance the radio, baseband, link controller and link manager layer, or parts or equivalents thereof), whereas host processor 6 implements the higher layers (for instance the logical link control and adaptation protocol layer, the service discovery protocol layer, the RFCOMM layer and the object exchange layer, or parts or equivalents thereof). Both BT module 7 and host processor 6 implement both transmission and reception of BT data packets.

Figure 7A:
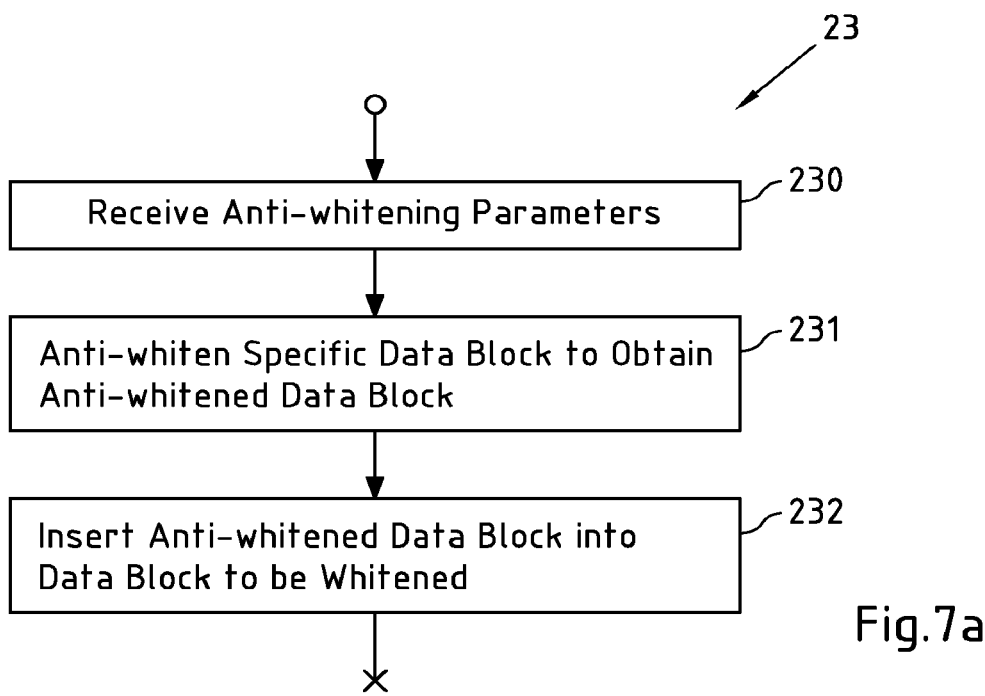
FIG. 7a: a flowchart of an exemplary embodiment of a method according to the first aspect of the present invention.

Host processor 6 comprises a Central Processing Unit (CPU) 60, which executes program code stored in Read-Only Memory (ROM) 61, and interfaces with Random Access Memory (RAM) 62 for storing data. Furthermore CPU 60 controls interface (I/F) 63 to implement HCI 8. The program code stored in ROM 61 may for instance comprise program code portions that cause CPU 60 to perform the steps of flowchart 23, which is depicted in FIG. 7a and represents an exemplary embodiment of the first aspect of the present invention. These steps are as follows:

In a first step 230, parameters required for anti-whitening are received, for instance from BT module 7. These parameters may for instance be the channel index that may be required to initialize a linear feedback shift register that is used for anti-whitening, see the description of FIG. 5 below.

In a second step 231, a specific data block is anti-whitened to obtain an anti-whitened data block. The specific data block may for instance be the positioning data block 4222 of data packet (see FIG. 2).

In a step 232, the anti-whitened data block is inserted into a data block that is to be whitened. This data block to be whitened may for instance a data block comprising the PDU data block 42 and the CRC data block 43.

BT module 7 comprises a CPU 70 for executing program code stored in ROM 71 and interfaces with RAM 62 for storing data. CPU 70 further controls interface 73 to implement HCI 8. BT module 7 further comprises a Radio Frequency (RF) unit 74 that may for instance comprise one or more antennas and related switching circuitry.

Figure 8A:
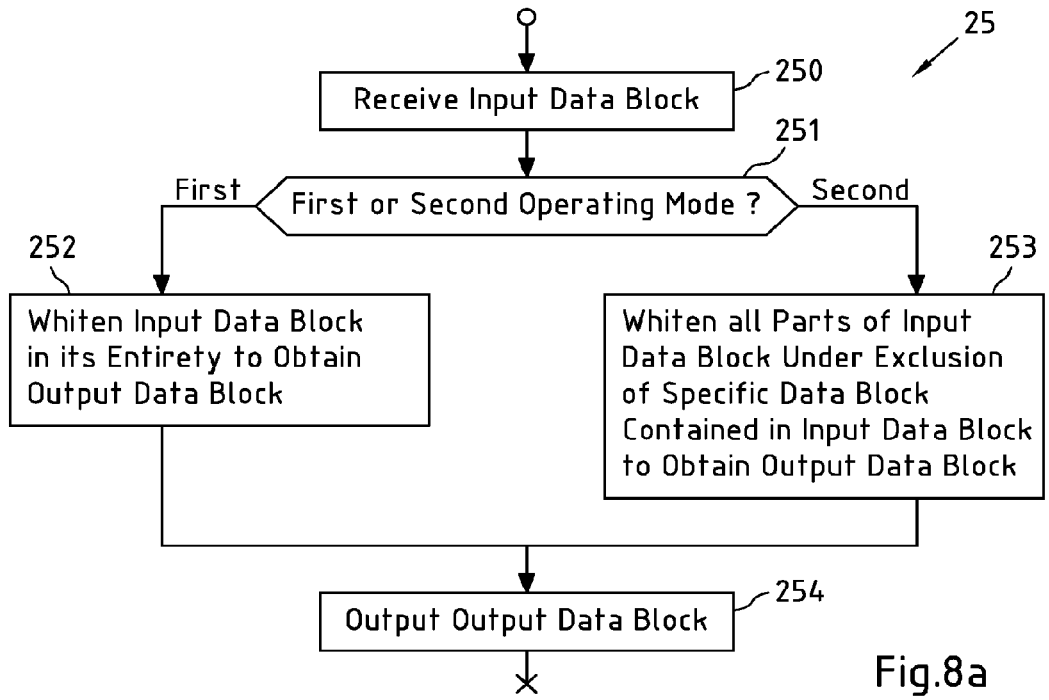
FIG. 8a: a flowchart of an exemplary embodiment of a method according to the second aspect of the present invention.

The program code stored in ROM 71 may for instance cause CPU 70 to perform the steps of flowchart 25, which is depicted in FIG. 8a and represents an exemplary embodiment of the second aspect of the present invention. These steps are as follows:

In a first step 250, an input data block is received, for instance a data block that comprises PDU data block 42 and CRC data block 43.

In a step 251, it is then determined if CPU 70 is in a first operating mode or in a second operating mode.

In the first case, the flowchart jumps to step 252 and whitens the input data block in its entirety to obtain an output data block, which is then output in step 254.

In the second case, the flowchart jumps to step 253, and all parts of the input data block are whitened under exclusion of a specific data block contained in the input data block to obtain an output data block that is then output in step 254. The specific data block may for instance be the positioning data block 4222 of data packet 4.

Figure 8B:
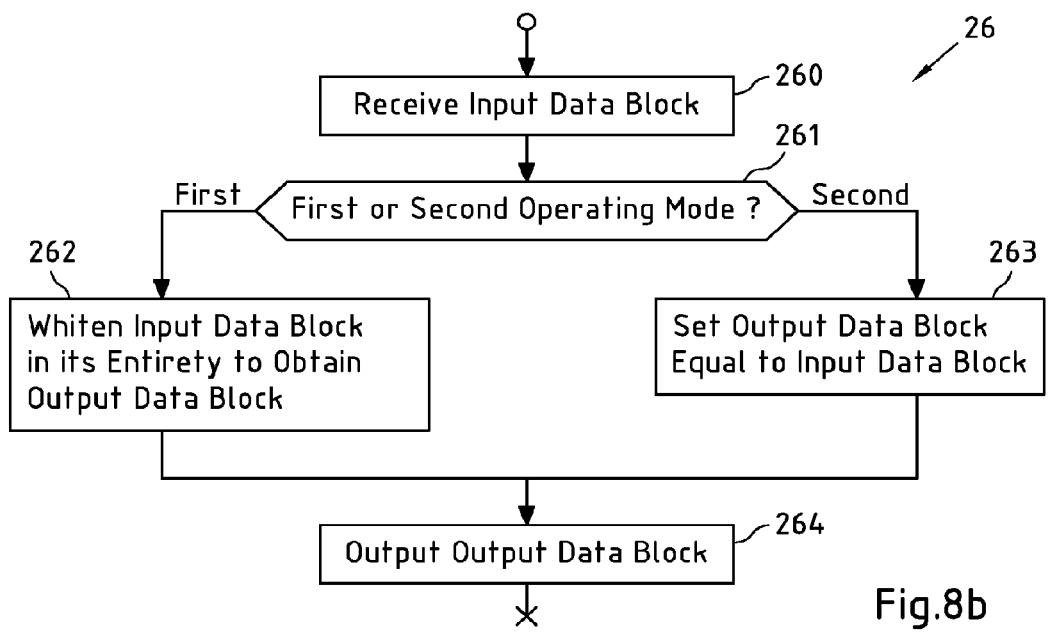
FIG. 8b: a flowchart of a further exemplary embodiment of a method according to the second aspect of the present invention.

Program code stored in ROM 71 may for instance alternatively cause CPU 70 to perform the steps of flowchart 26, which is depicted in FIG. 8b and represents a further exemplary embodiment of the second aspect of the present invention. These steps are as follows:

In a first step 260, an input data block is received, for instance a data block that comprises PDU data block 42 and CRC data block 43.

In a step 261, it is then determined if CPU 70 is in a first operating mode or in a second operating mode.

In the first case, the flowchart jumps to step 262 and whitens the input data block in its entirety to obtain an output data block, which is then output in step 264.

In the second case, the flowchart jumps to step 263, and the output data block is simply set equal to the input data block. The output data block is then output in step 264. Thus no whitening is performed on the input data block at all.

Figure 8C:
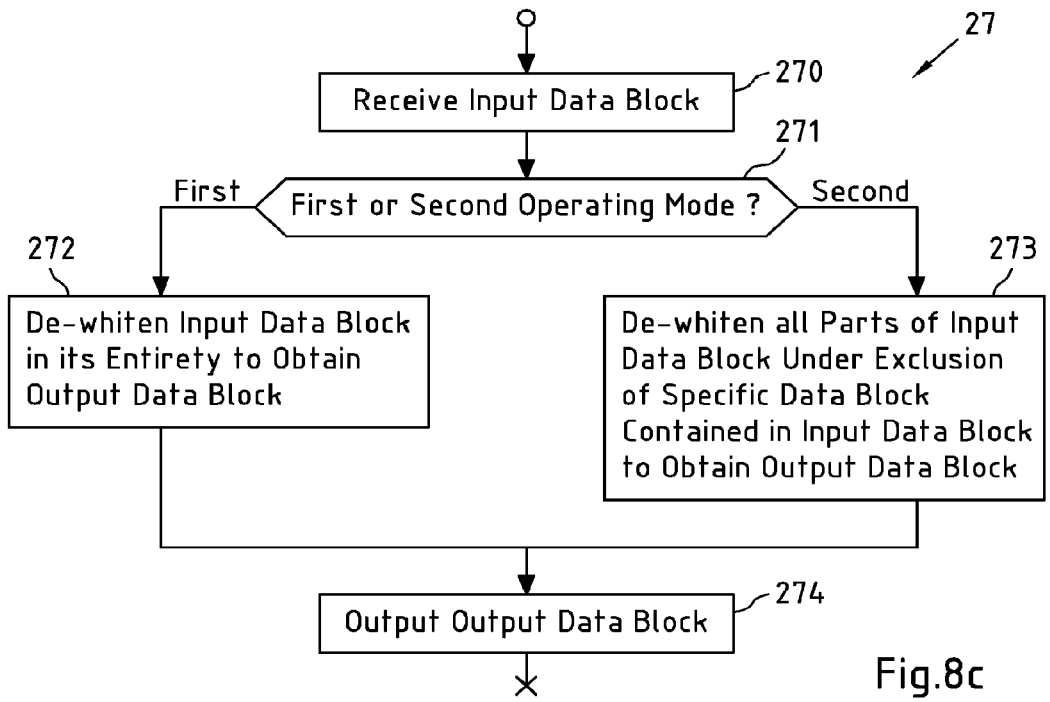
FIG. 8c: a flowchart of a further exemplary embodiment of a method according to the second aspect of the present invention.

Program code stored in ROM 71 may for instance alternatively cause CPU 70 to perform the steps of flowchart 27, which is depicted in FIG. 8c and represents a further exemplary embodiment of the second aspect of the present invention, however with respect to de-whitening. These steps are as follows:

In a first step 270, an input data block is received, for instance a data block that is a whitened representation of a data block that comprises PDU data block 42 and CRC data block 43.

In a step 271, it is then determined if CPU 70 is in a first operating mode or in a second operating mode.

In the first case, the flowchart jumps to step 272 and de-whitens the input data block in its entirety to obtain an output data block, which is then output in step 274.

In the second case, the flowchart jumps to step 273, and all parts of the input data block are de-whitened under exclusion of a specific data block contained in the input data block to obtain an output data block that is then output in step 274. The specific data block may for instance be a positioning sequence contained in the positioning data block 4222 of data packet 4.

Figure 8D:
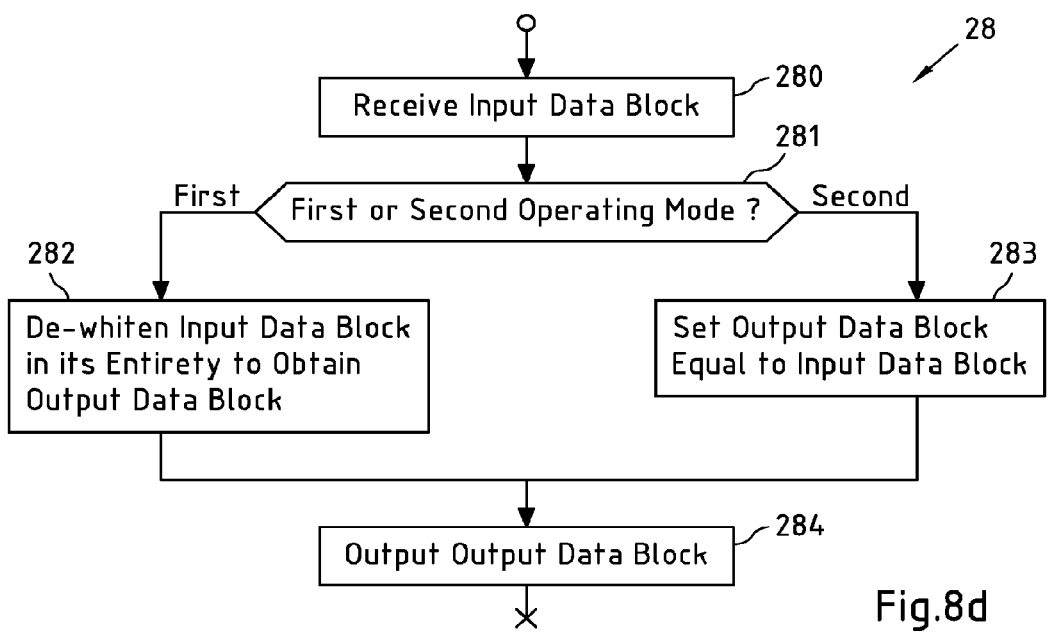
FIG. 8d: a flowchart of a further exemplary embodiment of a method according to the second aspect of the present invention.

Program code stored in ROM 71 may for instance alternatively cause CPU 70 to perform the steps of flowchart 28, which is depicted in FIG. 8d and represents a further exemplary embodiment of the second aspect of the present invention, however related to de-whitening. These steps are as follows:

In a first step 280, an input data block is received, for instance a data block that is a whitened representation of a data block that comprises PDU data block 42 and CRC data block 43.

In a step 281, it is then determined if CPU 70 is in a first operating mode or in a second operating mode.

In the first case, the flowchart jumps to step 282 and de-whitens the input data block in its entirety to obtain an output data block, which is then output in step 284.

In the second case, the flowchart jumps to step 283, and the output data block is simply set equal to the input data block. The output data block is then output in step 284. Thus no de-whitening is performed on the input data block at all.

Figure 9:
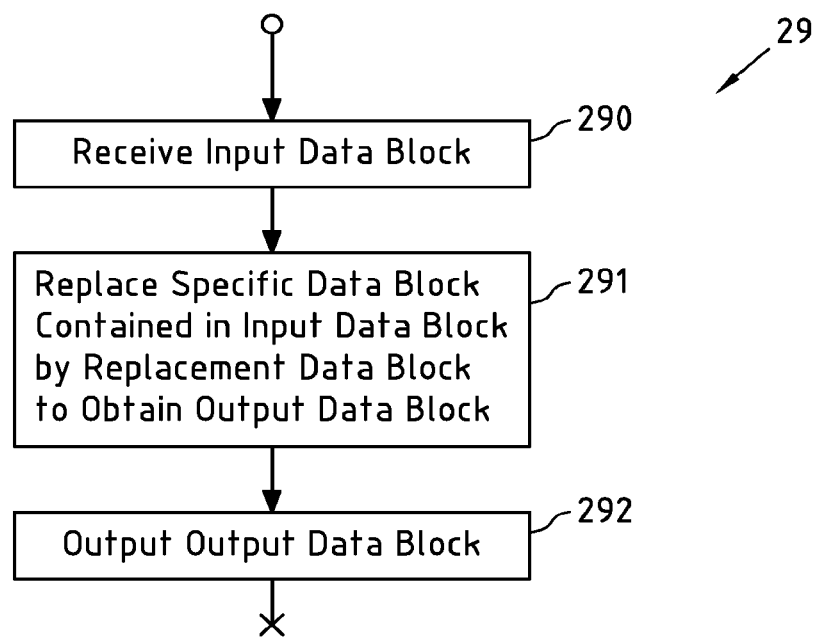
FIG. 9: a flowchart of an exemplary embodiment of a method according to the third aspect of the present invention.

Furthermore, the program code stored in ROM 71 may for instance also cause CPU 70 to perform the steps of flowchart 29, which is depicted in FIG. 9 and represents an exemplary embodiment of the third aspect of the present invention. These steps are as follows:

In a first step 290, an input data block is received. This may for instance be a received representation of a data block that comprises PDU data block 42 and CRC data block 43.

In a second step 291, a specific data block contained in the input data block is replaced by a replacement data block to obtain an output data block, which is then output in step 292. Therein, the specific data block may for instance be a received representation of a positioning sequence that is corrupted due to switching between multiple antennas during single-channel reception.

It is readily understood by a person skilled in the art that the functionality provided by CPU 60 of host processor 6 and/or the functionality provided by CPU 70 of BT module 7 may equally well be completely or at least partially be implemented in hardware. BT module 7 may for instance comprise one or more Application Specific Integrated Circuits (ASICs), Digital Signal Processors (DSPs) or Field Programmable Gate Arrays (FPGAs) that take over some or all of the functionality of CPU 70.

FIG. 3b schematically illustrates components of a further exemplary embodiment of an apparatus 9 according to the present invention. Apparatus 9 may for instance be considered as an exemplary embodiment of the first, second or third aspect of the present invention. Apparatus 9 may for instance be comprised in apparatuses 1 and 2 of FIG. 1.

In the context of a BT system, apparatus 9 can be considered to implement some or all layers of the BT protocol stack (for instance the radio, baseband, link controller and link manager layer, the logical link control and adaptation protocol layer, the service discovery protocol layer, the RFCOMM layer and the object exchange layer, or parts or equivalents thereof). Apparatus 9 implements both transmission and reception of BT data packets.

Figure 7B:
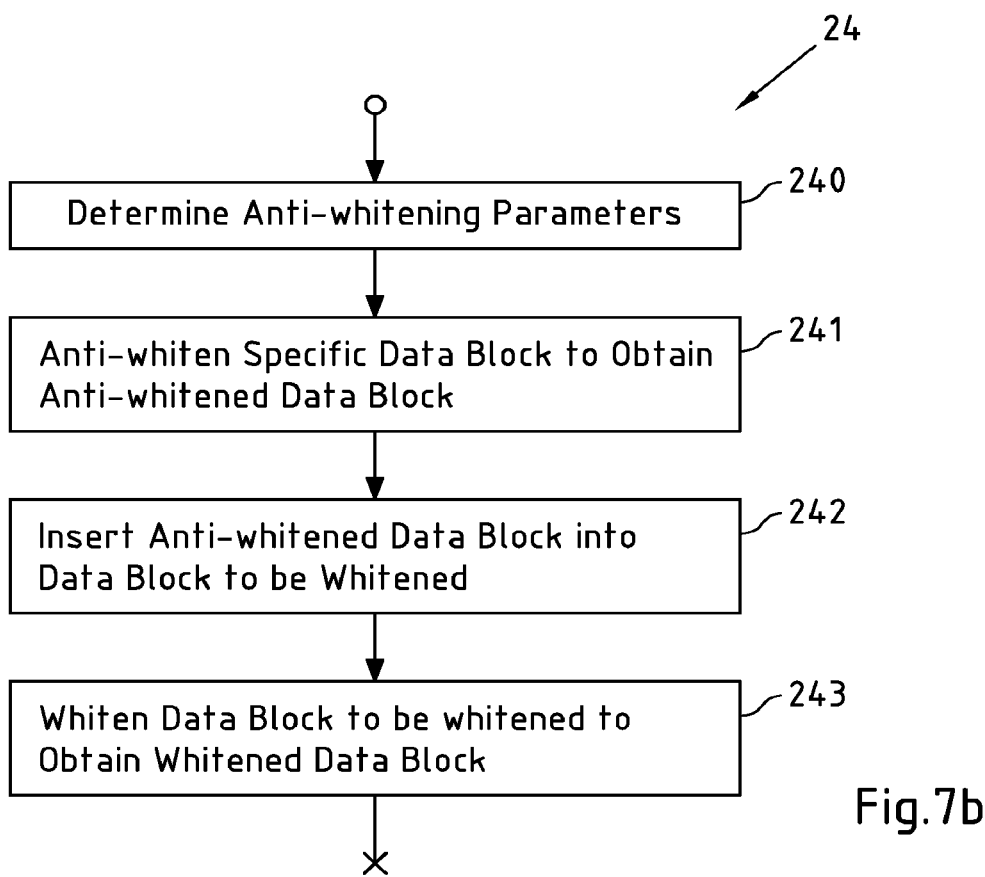
FIG. 7b: a flowchart of a further exemplary embodiment of a method according to the first aspect of the present invention.

Apparatus 9 comprises a CPU 90, which executes program code stored in ROM 91, and interfaces with RAM 92 for storing data. Apparatus 9 further comprises a Radio Frequency (RF) unit 93 that may for instance comprise one or more antennas and related switching circuitry. The program code stored in ROM 91 may for instance comprise program code portions that cause CPU 90 to perform the steps of flowchart 24, which is depicted in FIG. 7b and represents an exemplary embodiment of the first aspect of the present invention. These steps are as follows:

In a first step 240, parameters required for anti-whitening are determined. These parameters may for instance be the channel index that may be required to initialize a linear feedback shift register that is used for anti-whitening, see the description of FIG. 5 below.

In a second step 241, a specific data block is anti-whitened to obtain an anti-whitened data block. The specific data block may for instance be the positioning data block 4222 of data packet (see FIG. 2).

In a step 242, the anti-whitened data block is inserted into a data block that is to be whitened. This data block to be whitened may for instance a data block comprising the PDU data block 42 and the CRC data block 43.

In a step 243, the data block that is to be whitened is whitened to obtain a whitened data block, for instance by using a linear feedback shift register, such as for instance the linear feedback shift register described with reference to FIG. 5 below.

Furthermore, the program code stored in ROM 91 may for instance cause CPU 90 to perform the steps of any of the flowcharts 25-28 (see FIGS. 8a-8d) as described with reference to CPU 70 in FIG. 3a above.

Even further, the program code stored in ROM 91 may for instance also cause CPU 90 to perform the steps of flowchart 29 (see FIG. 9), as described with reference to CPU 70 in FIG. 3a above.

It is readily understood by a person skilled in the art that the functionality provided by CPU 90 of apparatus 9 may equally well be completely or at least partially be implemented in hardware. For instance, apparatus 9 may comprise one or more Application Specific Integrated Circuits (ASICs), Digital Signal Processors (DSPs) or Field Programmable Gate Arrays (FPGAs) that take over some or all of the functionality of CPU 90.

FIG. 4a schematically illustrates functional units that are implemented by exemplary embodiments of apparatuses according to the first aspect of the present invention. It is to be noted that only those functional units that are required to understand the different aspects of the present invention are illustrated and discussed here in detail, not excluding the presence of further functional units.

The functional units are illustrated in the context of the protocol layer they are associated with. FIG. 4a shows a block 12 that combines higher protocol layers, a block 13 that is a Medium. Access Control (MAC) layer, and a block 14 that combines Base-Band (BB) and RF layers.

In the context of the BT system, block 12 can be considered to combine the protocol layers above the HCI, and blocks 13 and 14 can be considered to be related to protocol layers below the HCI. The higher layer protocols of block 12 may for instance be implemented by host processor 6 of FIG. 3a, or by apparatus 9 of FIG. 3b. The MAC layer of block 13 and the BB and RF layer of block 14 may be considered to be implemented by BT module 7 of FIG. 3a or apparatus 9 of FIG. 3b.

Block 12, combining the higher layer protocols, comprises a functional unit 120 for payload assembly. This functional unit is configured to insert different data blocks into the payload data block 422 of data packet 4 (see FIG. 2). In particular, payload assembly unit 120 inserts information 4220 on the positioning data block 4222 (see FIG. 2), data 4221 and the positioning data block 4222 into payload data block 422 of data packet 4.

According to the first aspect of the present invention, this positioning data block 4222 comprises an anti-whitened representation of a positioning sequence, which positioning sequence may for instance be a long sequence of "0"s or "1"s (or any other sequence that is suited to allow direction estimation with a single-channel multi-antenna transmitter or receiver), for instance a sequence entirely made up of "0"s. Anti-whitening of this positioning sequence is performed in anti-whitening unit 121. For anti-whitening, for instance the same linear feed-back shift register that is used for whitening in functional unit 131 may be applied. An exemplary embodiment of such a shift register will be discussed with reference to FIG. 5 below.

It should be noted that (anti-whitened) positioning sequences may not have to be transmitted in each data packet that is transmitted by a BT transmitter. To this end, payload assembly unit 120 may further be configured to fill payload data block 422 only with data from higher protocol layers (e.g. user data), i.e. not to include information 4220 and positioning data block 4222 into payload data block 422 at all.

MAC layer 13 comprises a CRC unit 130 and a whitening unit 131. CRC unit 130 determines the CRC data block 43 of the data packet 4, and whitening unit 131 performs whitening on the entire PDU data block 42 and the CRC data block 43. This whitening may for instance be performed by feeding PDU data block 42 and CRC data block 43 into a linear feedback shift register. An exemplary embodiment of such a shift register will be discussed with reference to FIG. 5 below.

Block 14, combining the BB and RF protocol layers, comprises a modulation unit 140, an RF conversion unit 142 and at least one antenna 142. Bits of data packet 4 are modulated by modulation unit 140, for instance according to the Gaussian Minimum Shift Keying (GMSK) modulation scheme in case of a BT system, mixed to an RF frequency by RF conversion unit 141, for instance 2.4 GHz in case of a BT system, and transmitted via an antenna (or more antennas).

Therein, introducing anti-whitening unit 121 and configuring payload assembly unit 120 to insert an anti-whitened representation of a positioning sequence into data packet 4 has the effect that—due to the whitening performed by whitening unit 131 on the PDU data block 42 and the CRC data block 43 of the BT data packet 4—the positioning sequence is transmitted to the receiver in non-whitened form, so that it can be easily exploited by the receiver for direction estimation.

It is to be noted that the first aspect of the present invention may be implemented in the context of a BT system, without requiring any changes to the lower protocol layers, i.e. the protocol layers below the HCI. These protocol layers may then be unaware that the transmitted data packet 4 (see FIG. 2) comprises a positioning sequence (or an anti-whitened representation thereof) at all. In particular, whitening may be performed for the PDU data blocks 42 and the CRC data block 43 independent of whether the data packet 4 comprises a positioning sequence (or an anti-whitened representation thereof) or not. However, it might be necessary to provide anti-whitening unit 121 in block 12 with information on the channel index (the advertising channel index or the data channel index after possible remapping), since the whitening, and thus also the anti-whitening, may depend on this channel index, as will be discussed with reference to the exemplary embodiment of a whitening/anti-whitening linear feedback shift register in FIG. 5 below.

FIG. 4b schematically illustrates functional units that are implemented by exemplary embodiments of apparatuses according to the second aspect of the present invention. It is to be noted that only those functional units that are required to understand the different aspects of the present invention are illustrated and discussed here in detail, not excluding the presence of further functional units.

As in FIG. 4a, the functional units in FIG. 4b are illustrated in the context of the protocol layer they are associated with. FIG. 4b shows a block 15 that combines higher protocol layers, a block 16 that is a Medium Access Control (MAC) layer, and a block 14 that combines Base-Band (BB) and RF layers. Block 14 of FIG. 4b corresponds to block 14 in FIG. 4a and it thus not described in further detail below.

In the context of the BT system, block 15 can be considered to combine the protocol layers above the HCI, and blocks 16 and 14 can be considered to be related to protocol layers below the HCI. The higher layer protocols of block 15 may for instance be implemented by host processor 6 of FIG. 3a, or by apparatus 9 of FIG. 3b. The MAC layer of block 16 and the BB and RF layer of block 14 may be considered to be implemented by BT module 7 of FIG. 3a or apparatus 9 of FIG. 3b.

Block 15, combining the higher layer protocols, comprises a functional unit 150 for payload assembly. This functional unit is configured to insert different data blocks into the payload data block 422 of data packet 4 (see FIG. 2). In particular, payload assembly unit 150 inserts information 4220 on the positioning data block 4222 (see FIG. 2), data 4221 and the positioning data block 4222 into payload data block 422 of data packet 4.

According to the second aspect of the present invention, this positioning data block 4222 comprises a positioning sequence, which positioning sequence may for instance be a long sequence of "0"s or "1"s (or any other sequence that is suited to allow direction estimation with a single-channel multi-antenna transmitter or receiver), for instance a sequence entirely made up of "0"s. In contrast to the first aspect of the present invention (exemplarily embodied by the functional units 120 and 121 in FIG. 4*a*), this positioning sequence is not subject to anti-whitening before being inserted into positioning data block 4222 of data packet 4, since it is taken care of in lower protocol layers that the positioning sequence is not whitened.

MAC layer 16 comprises a CRC unit 160 and a controllable whitening unit 161. CRC unit 160 determines the CRC data block 43 of the data packet 4. Controllable whitening unit 161 is configured to be controllable to work in at least two operating modes.

In a first operating mode, which corresponds to an operating mode in which no positioning data block 4222 (and related information 4220) has been inserted into payload data block 422 of data packet 4, i.e. to an operating mode in which only data from higher protocol layers (e.g. user data) is to be transmitted in a data packet 4, whitening unit 161 whitens both PDU data block 42 and CRC data block of data packet 4 (see FIG. 2). This may for instance be performed by a linear feedback shift register. An exemplary embodiment of such a linear feedback shift register will be discussed with reference to FIG. 5 below.

In a second operating mode, which corresponds to an operating mode in which a positioning data block 4222 (and related information 4220) has been inserted into payload data block 422 of data packet 4, whitening unit 161 whitens data blocks 420, 421, 4220, 4221 and 43 of data packet 4, but excludes positioning data block 4222 from the whitening operation.

In an alternative exemplary embodiment, in the second operating mode, in which a positioning data block 4222 (and related information 4220) has been inserted into payload data block 422 of data packet 4, whitening unit does not whiten PDU data block 42 and CRC data block 43 at all.

In both alternatives of the second operating mode, for instance a data packet 4 with a special format, i.e. a format that deviates from a standard format of data packet 4, may be used. Such a special data packet 4 could then be considered as a location-estimation data packet. The property of data packet 4 being a location-estimation data packet may for instance be indicated by a specific flag or identifier, for instance in a header section, of the location-estimation data packet, or by separate signaling. Based on such a flag or identifier, or on such separate signaling, the MAC layer 16, and in particular controllable whitening unit 161, may be informed that only partial whitening or no whitening of PDU data block 42 and CRC data block 43 shall be performed. This may require the higher layers block 15 and the MAC layer 16 to support different types of data packets 4, i.e. standard data packets and location-estimation data packets. When receiving such a location-estimation data packet, MAC layer 16 may be aware that a pre-defined portion of the location-estimation data packet shall not be whitened, or, alternatively, that the location-estimation data packet shall not be whitened at all.

In both embodiments of controllable whitening unit 161, whitening unit 161 causes that, in the second operating mode, data packet 4 transmitted to the receiver comprises a positioning sequence in non-whitened form, which can be easily exploited by the receiver for direction estimation.

It is to be noted that the above-described embodiments according to the second aspect of the present invention, in which embodiments only the positioning data block 4222 is not whitened, or in which the PDU data block 42 and the CRC data block 43 are not whitened, no information on the channel index has to be provided to functional units in the higher protocol layers of block 15, since no anti-whitening has to be performed there.

Figure 5:
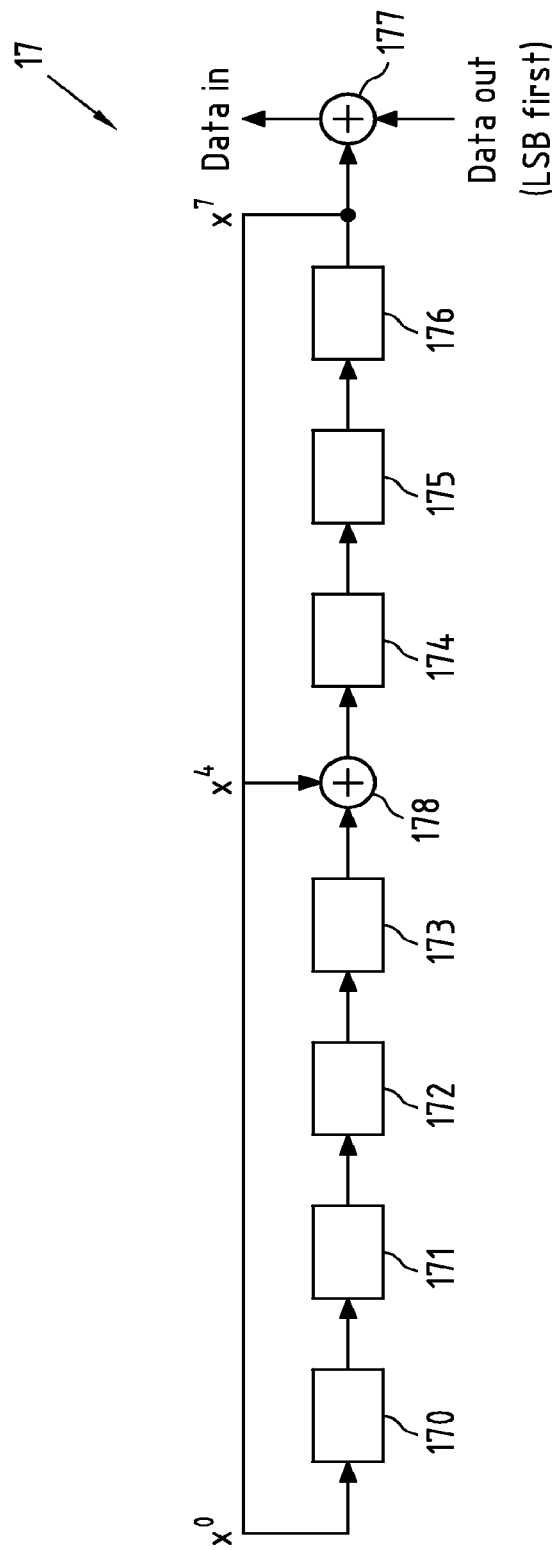
FIG. 5: a schematic illustration of an exemplary embodiment of a linear feedback shift register for whitening/anti-whitening/de-whitening.

FIG. 5 schematically illustrates an exemplary embodiment of a linear feedback shift register 17 that may be used for whitening (for instance in unit 131 of FIG. 4*a* and unit 161 in FIG. 4*b*), anti-whitening (for instance in unit 121 in FIG. 4*a*) and de-whitening (for instance in the MAC layer of the receiver).

The shift register 17 comprises seven registers (delay elements) 170-176. In each clock cycle, the content of a register and the output of adder 178 is forwarded to the next register or to an adder 178/177 as indicated by the arrows in FIG. 5. Therein, the feedback function of the shift register 17 is given by the polynomial $x^7+x^4+1$, as indicated in FIG. 5.

As can be seen from adder 177, in each clock cycle, the output of the last register 176 is simply added to each input data bit (which the Least Significant Bit (LSB) first) to obtain an output data bit. The values added to the input data bits thus only depend on the initial state of the registers 170-176, and on the number of register shifts that have already taken place (irrespective of the input data bits).

The shift register is initialized as follows. Register 170 is set to "1". Registers 171-176 are set equal to the 6-bit channel index of the actually used channel (i.e. for instance the advertising channel index or the data channel index after possible re-mapping), with the Most Significant Bit (MSB) in register 171 and the LSB in register 176.

Since the adder 177 of shift register 17 implements an eXclusive-OR (XOR) function, it follows that, when applying shift register 17 twice on a data block, each time with the same initialization of shift register 17, the original data block is obtained again. For this reason, shift register 17 can be deployed for both anti-whitening and whitening, and also for both whitening and de-whitening.

Shift register 17 may thus for instance be used for anti-whitening of a positioning sequence to obtain a positioning data block 4222 to be inserted into payload data block 422 of data packet 4 (see FIG. 2) by initializing shift register 17 as described above, clocking shift register 17 for a number of clock cycles that corresponds to the number of bits in the fields 420, 421, 4220 and 4221 without adding the output of register 176 to the positioning sequence, and only then starting to bit-wise add the output of register 176 to the positioning sequence while further clocking on shift register 17.

Similarly, when excluding data block from whitening, as for instance performed in controllable whitening unit 161 of FIG. 4*b* in one alternative of the second operating mode, shift register 17 is initialized and normally operated (i.e. clocked on and the outputs of register 176 are bitwise added to the input bits of the data block to be whitened) until the data block to be excluded starts. The output of register 176 is then disconnected from adder 177, and the shift register is clocked further, so that the data block to be excluded is not subject to addition of contents of register 176. When the data block to be excluded has ended, the output of register 176 is connected to adder 177 again to perform whitening on subsequent data blocks.

FIG. 6a schematically illustrates functional units that are implemented by exemplary embodiments of apparatuses according to the third aspect of the present invention. It is to be noted that only those functional units that are required to understand the different aspects of the present invention are illustrated and discussed here in detail, not excluding the presence of further functional units.

The functional units are illustrated in the context of the protocol layer they are associated with. FIG. 6a shows a block 21 that combines higher protocol layers, a block 20 that is a MAC layer, and a block 18 that combines BB and RF layers.

In the context of the BT system, block 21 can be considered to combine the protocol layers above the HCI, and blocks 18 and 20 can be considered to be related to protocol layers below the HCI. The higher layer protocols of block 21 may for instance be implemented by host processor 6 of FIG. 3a, or by apparatus 9 of FIG. 3b. The MAC layer of block 20 and the BB and RF layer of block 18 may be considered to be implemented by BT module 7 of FIG. 3a or apparatus 9 of FIG. 3b.

Therein, the embodiment of FIG. 6a may be considered to be suited to receive data packets that have been constructed under usage of anti-whitening according to the first aspect of the present invention. An embodiment that is suited to receive data packets that have been constructed with controllable whitening according to the second aspect of the present invention will be discussed with reference to FIG. 6b below.

Block 18 of FIG. 6a, related to the RF and BB layer, comprises an antenna array, which exemplarily consists of four antennas, of which only antennas 180 and 184 are depicted. The received signals from these antennas are fed into an RF switch 1850 that is comprised in direction sensor 185. It is the task of RF switch 1850 to cycle through the four antennas, for instance in a way as illustrated by the time periods 5-1 to 5-N and the interposed switching periods in FIG. 2 so that only one of the N=4 antennas is connected to the single-channel receiver that is represented by units 187-196 at a given time instance, or in a back-and-forth way as described with reference to FIG. 2 above, or in any other way that allows to determine phase and/or amplitude differences between the signals received by the four antennas. To this end, RF switch 1850 is controlled by switch control unit 1860 of antenna switching unit 186, as will be explained further below.

The output signal of RF switch 1850 is fed into an RF unit 187 that performs Adaptive Gain Control (AGC) and down-conversion on the received signals in a unit 1871 and recovers the Inphase (I) and Quadrature (Q) branches of the receive signal. The I and Q signals are then analog-to-digital converted in units 188 and 189 and fed into a Look-Up Table (LUT) 190 to determine the phase that is associated with the digital I and Q signals. A delayed representation (unit 191) of the phase signal is then subtracted from the phase signal in an adder 192, and post detection Finite-Impulse Response (FIR) post detection filtering (unit 193) is applied to the resulting signal. Unit 194 performs estimation of timing and frequency and also performs bit detection. In other words, units 187-194 may be considered to perform GMSK demodulation.

In slicer unit 196, the preamble 40 and the synchronization word 41 (see FIG. 2) are extracted and fed to MAC block 20. Equally well, a representation of the bits of the PDU data block 42 and CRC data block 43 are extracted.

The bits at the lowermost output of slicer unit 196 are considered as a representation of the bits of the PDU data block 42 and the CRC data block 43 since they may for instance be at least partially in whitened form and/or furthermore be at least partially corrupted by switching performed during reception of the positioning sequence (i.e. during reception of the RF signal that corresponds to the positioning sequence). Switching causes corruption since the amplitude and phase differences caused by different propagation delays from the transmit antenna to the different receive antennas are lumped to the single receive signal by the switching operation without compensation.

The representation of the bits of the PDU data block 42 and the CRC data block 43 are then processed by a switch effect remover 196, which replaces a specific data block in the representation of the bits of the PDU data block 42 and the CRC data block 43 by a replacement data block. The aim of this replacement is to compensate for the above-described effects of switching during the reception of the specific data block, so that at least the data in field 4221 of the data packet 4 can be further processed by the MAC layer or higher layers (for instance, to allow the CRC data block 43, which depends on the data of the entire PDU data block 42 that comprises both the data field 4221 and the positioning data block 4222, to be analyzed properly). The switch effect remover thus allows for transparent antenna switching during data packet reception.

For instance, if the positioning data block 4222 of data packet 4 contains an anti-whitened positioning sequence, which is subject to whitening prior to transmission, the replacement data block will be the positioning sequence (i.e. the whitened anti-whitened positioning sequence).

Switch effect remover is controlled by feedback from the MAC layer 20. A de-whitening unit 200 in MAC layer 20 performs de-whitening, for instance based on the linear feedback shift register of FIG. 5. This yields the bits of the PDU data block 42 and the CRC data block 43 of data packet 4 in non-whitened (original) form, so that the information 4220 on the positioning data block 4222 can be analyzed. Since this information indicates the position and length of the positioning data block in the data packet, as well as the positioning data block itself, MAC layer 20 can control switch effect remover to replace the portion of the representation of the bits of the PDU data block 42 and the CRC data block 43 that corresponds to the positioning data block 4222 by a replacement data block.

De-whitening is thus performed on the fields 420, 421, 4220, 4221 and 4222, which all have been subject to whitening prior to transmission. The fields 420, 421, 4220 and 4221 are then obtained in non-whitened (original) form, whereas the positioning sequence, which is transmitted in non-whitened form, is then obtained in de-whitened form. This de-whitened form corresponds to the anti-whitened form, if for instance the same linear feedback-shift register is used for anti-whitening, whitening and de-whitening. The PDU data block 42 is thus recovered by de-whitening unit, so that, in CRC unit 201, a CRC value can be computed and compared to the value in the CRC data block 43 to determine if transmission errors have occurred in PDU data block 42. Furthermore, MAC layer 20 may perform error correction based on a Forward Error Correction (FEC) procedure based on the recovered PDU data block 42 and the CRC data block 43.

As already discussed above, MAC layer 20 controls switch effect remover 196 based on the information 4220 on the position data block 4222. This information is also exploited to control antenna switching unit 186. This unit may for instance be informed by a unit in MAC layer 20 when reception of a positioning data block will start, and when it will end. Antenna switching unit 186 comprises a switch control unit that then can turn on and off the switching of the RF switch 1850 between the different antennas accordingly. If other parts of the data packet than the positioning data block are received, switch control unit 1860 turns of RF switch 1850 so that these parts of the data packet are received without switching between the antennas.

Antenna switching unit 186 further comprises an I & Q saver 1861 that receives the I and Q signals from analog-to-digital converters 188 and 189, in particular those that are received during reception of the positioning data block. These I and Q signals are stored and forwarded to the higher layers block 21, where they are exploited for estimating a direction towards the transmitter. It is readily understood by a person skilled in the art that the functionality of I & Q saver 1861 may also be extended to comprise for instance calculation and/or averaging of phase differences and/or relative amplitudes of the signals received at the different antennas 180 to 184, or to comprise direction estimation. Such measures may contribute to reduce the amount of data that has to be passed between blocks 18 and 21.

Switching may for instance yield the following amount of data: From each of the N antennas (which may for instance be N=4 antennas, however up to 32 or more antennas may be used in an indoor positioning use case) $n_s$ samples (for instance 1-8 samples) are taken before switching to the next antenna. The antennas are looped through $n_f$ (for instance 1-8) times. The total number of packets generated is such a switching procedure (during reception of the positioning data block) is thus $n_{tot} = N \times n_s \times n_f$. One sample consists of an I and Q value which may for instance have 4-8 bits each.

To complete the description of FIG. 6a, higher layers block 21 further comprises a unit 210 for utilising the payload contain in field 422 of the data packet 4 and receiver from units in the MAC block 20.

FIG. 6b schematically illustrates functional units that are implemented by further exemplary embodiments of apparatuses according to the second and third aspect of the present invention. It is to be noted that only those functional units that are required to understand the different aspects of the present invention are illustrated and discussed here in detail, not excluding the presence of further functional units.

FIG. 6b only differs from FIG. 6a by replacement of MAC block 20 by a differing MAC block 22. For the description of the other blocks 18 and 21 and of the interaction of the functional units comprised therein, reference is made to the description of FIG. 6a above.

The embodiment of FIG. 6b may be considered to be suited to receive data packets that have been constructed under usage of controllable whitening according to the second aspect of the present invention.

To this end, MAC layer 22 comprises a controllable de-whitening unit 220, which mirrors a controllable whitening unit at a transmitter site (for instance the controllable whitening unit 161 in FIG. 4b). Controllable de-whitening unit 220 is configured to be controllable to work in at least two operating modes.

In a first operating mode, which corresponds to an operating mode in which no positioning data block 4222 (and related information 4220) has been inserted into payload data block 422 of data packet 4, i.e. to an operating mode in which only data from higher protocol layers (e.g. user data) is to be transmitted in a data packet 4, de-whitening unit 220 de-whitens the entire PDU data block 42 and CRC data block This may for instance be performed by a linear feedback shift register, for instance the linear feedback shift register of FIG. 5.

In a second operating mode, which corresponds to an operating mode in which a positioning data block 4222 (and related information 4220) has been inserted into payload data block 422 of data packet 4, de-whitening unit 220 de-whitens data blocks 420, 421, 4220, 4221 and 43, but excludes positioning data block 4222 from the de-whitening operation to account for the fact that positioning data block 4222 has also been excluded from whitening a the transmitter side.

In an alternative exemplary embodiment, in the second operating mode, in which a positioning data block 4222 (and related information 4220) has been inserted into payload data block 422 of data packet 4, de-whitening unit 220 does not de-whiten PDU data block 42 and CRC data block 43 at all to account for the fact that the entire PDU data block 42 and CRC data block 43 have not been whitened at the transmitter side.

In both embodiments, de-whitening is thus performed in a way that, at the output of the de-whitening unit 220, the PDU data block 42 and the CRC data block 43 of data packet 4 are recovered in completely non-whitened form, so that units of MAC block 22 may perform error detection and/or error correction on the data packet and forward the payload to higher layers block 21.

The replacement block handed from MAC layer 22 to switch effect remover unit 196 will, in both of the above embodiments, equal the positioning sequence (in non-whitened form).

As already discussed with reference to FIG. 4b above, the controllable de-whitening unit 220 in MAC layer 22 may be responsive to a flag or identifier in data packet 4 or to separate signaling that indicate that data packet 4 is a location-estimation data packet for which only partial de-whitening or no whitening of specific parts thereof shall be performed (second operating mode), or that data packet 4 is a standard packet for which de-whitening has to be performed (first operating mode). Both the MAC layer 22 and the higher layers 21 then may have to be capable of supporting different types of data packets 4, i.e. standard data packets and location-estimation data packets.

It is to be noted that in both of the above embodiments, transmission of data in field 4221 is still possible in addition to the positioning data block.

If no whitening and de-whitening is performed for the entire PDU data block 42 and the CRC data block 43, it may also be considered to entirely skip transmission of data in field 4221 when transmitting a positioning data block. Data packet 4 may then for instance be defined as a special "positioning data packet" that at least should comprise the ID of the transmitter and the positioning sequence, but would not contain data of higher protocol layers.

It is readily clear for a person skilled in the art that the logical blocks in the schematic block diagrams as well as the flowchart and algorithm steps presented in the above description may at least partially be implemented in electronic hardware and/or computer software, wherein it may depend on the functionality of the logical block, flowchart step and algorithm step and on design constraints imposed on the respective devices to which degree a logical block, a flowchart step or algorithm step is implemented in hardware or software. The presented logical blocks, flowchart steps and algorithm steps may for instance be implemented in one or more digital signal processors (DSPs), application specific integrated circuits (ASICs), field programmable gate arrays (FPGAs) or other programmable devices. The computer software may be stored in a variety of computer-readable storage media of electric, magnetic, electro-magnetic or optic type and may be read and executed by a processor, such as for instance a microprocessor. To this end, the processor and the storage medium may be coupled to interchange information, or the storage medium may be included in the processor.

The invention has been described above by means of embodiments, which shall be understood to be exemplary and non-limiting. In particular, it should be noted that there are alternative ways and variations which are obvious to a skilled person in the art and can be implemented without deviating from the scope and spirit of the appended claims. It should also be understood that the sequence of all method steps presented above is not mandatory, also alternative sequences may be possible.

The invention claimed is:

1. An apparatus comprising:
   at least one processor, and
   at least one memory including program code,
   the at least one memory and the program code configured to with the at least one processor, cause the apparatus at least:
   to insert an anti-whitened data block, which is obtainable from a specific data block by anti-whitening, into a data block that is to be whitened by a whitening to yield a whitened data block, wherein said anti-whitening compensates said whitening so that said whitened data block will comprise said specific data block in non-whitened form, and wherein said specific data block is designed to be used by a receiver of said whitened data block to estimate a direction towards a transmitter of said whitened data block based on a received representation of said specific data block.

2. The apparatus according to claim 1, wherein said received representation of said specific data block is affected by switching through antennas of a single-channel multi-antenna transmitter during a transmission of said specific data block and/or by switching through antennas of a single-channel multi-antenna receiver during a reception of said specific data block.

3. The apparatus according to claim 1, wherein said at least one processor and a further processor, and said at least one memory including program code, cause the apparatus to perform at least one of said anti-whitening on said specific data block to obtain said anti-whitened data block and said whitening on said data block that is to be whitened to obtain said whitened data block.

4. The apparatus according to claim 1, wherein said data block that is to be whitened comprises information on said specific data block.

5. The apparatus according to claim 1, wherein said anti-whitening and said whitening are based on linear feedback shift registers with the same length, feedback and initialization.

6. The apparatus according to claim 1, wherein said apparatus is an apparatus that comprises an antenna or a communication device that comprises an antenna.

7. An apparatus comprising:
   an input configured to receive input data blocks;
   at least one processor, and
   at least one memory including program code,
   the at least one memory and the program code configured to with the at least one processor, cause the apparatus at least:
   to output, in a first operating mode, an output data block generated by whitening or de-whitening one of said input data blocks, which does not comprise a specific data block, in its entirety, and to output, in a second operating mode an output data block generated by whitening or de-whitening all parts of one of said input data blocks, which comprises said specific data block, under exclusion of said specific data block, so that said output data block comprises said specific data block in unchanged form, wherein said specific data block is designed to be used by a receiver of said output data block to estimate a direction towards a transmitter of said output data block based on a received representation of said specific data block.

8. The apparatus according to claim 7, wherein said received representation of said specific data block is affected by switching through antennas of a single-channel multi-antenna transmitter during a transmission of said specific data block and/or switching through antennas of a single-channel multi-antenna receiver during a reception of said specific data block.

9. The apparatus according to claim 7, wherein said one of said input data blocks received in said second operating mode comprises information on said specific data block.

10. The apparatus according to claim 7, wherein said apparatus is an apparatus that comprises an antenna or a communication device that comprises an antenna.

11. The apparatus according to claim 7, wherein said input data block comprises a Protocol Data Unit (PDU) part and a Cyclic Redundancy Check (CRC) part of a Bluetooth packet.

12. The apparatus according to claim 1, wherein said anti-whitened data block is inserted into only a part of said data block that is to be whitened.

13. The apparatus according to claim 1, wherein said data block that is to be whitened comprises a Protocol Data Unit part and a Cyclic Redundancy Check part of a Bluetooth packet, and wherein said anti-whitened data block is inserted into at least a part of said PDU part.

14. A method comprising:
   inserting an anti-whitened data block, which is obtainable from a specific data block by anti-whitening, into a data block that is to be whitened by a whitening to yield a whitened data block, wherein said anti-whitening compensates said whitening so that said whitened data block will comprise said specific data block in non-whitened form, and wherein said specific data block is designed to be used by a receiver of said whitened data block to estimate a direction towards a transmitter of said whitened data block based on a received representation of said specific data block.

15. The method according to claim 14, wherein said received representation of said specific data block is affected by switching through antennas of a single-channel multi-antenna transmitter during a transmission of said specific data block and/or by switching through antennas of a single-channel multi-antenna receiver during a reception of said specific data block.

16. The method according to claim 14, wherein said anti-whitened data block is inserted into only a part of said data block that is to be whitened.

17. The method according to claim 14, wherein said data block that is to be whitened comprises a Protocol Data Unit part and a Cyclic Redundancy Check part of a Bluetooth packet, and wherein said anti-whitened data block is inserted into at least a part of said PDU part.

18. The apparatus according to claim 1, wherein said whitening is also performed on said anti-whitened data block inserted into said data block.

19. The method according to claim 14, wherein said whitening is also performed on said anti-whitened data block inserted into said data block.

20. A method comprising:
   receiving input data blocks;
   outputting, in a first operating mode, an output data block generated by whitening or de-whitening one of said input data blocks, which does not comprise a specific data block, in its entirety, and
   outputting, in a second operating mode, an output data block generated by whitening or de-whitening all parts of one of said input data blocks, which comprises said specific data block, under exclusion of said specific data block, so that said output data block comprises said specific data block in unchanged form, wherein said specific data block is designed to be used by a receiver of said output data block to estimate a direction towards a transmitter of said output data block based on a received representation of said specific data block.

21. The method according to claim 20, wherein said received representation of said specific data block is affected by switching through antennas of a single-channel multi-antenna transmitter during a transmission of said specific data block and/or switching through antennas of a single-channel multi-antenna receiver during a reception of said specific data block.

22. The method according to claim 20, wherein said one of said input data blocks received in said second operating mode comprises information on said specific data block.

23. The method according to claim 20, wherein said input data block comprises a Protocol Data Unit (PDU) part and a Cyclic Redundancy Check (CRC) part of a Bluetooth packet.

24. A computer program product comprising a non-transitory computer readable storage medium encoded with instructions that, when executed by a processor, causes an apparatus at least to perform:
   receiving input data blocks;
   outputting, in a first operating mode, an output data block generated by whitening or de-whitening one of said input data blocks, which does not comprise a specific data block, in its entirety, and
   outputting, in a second operating mode, an output data block generated by whitening or de-whitening all parts of one of said input data blocks, which comprises said specific data block, under exclusion of said specific data block, so that said output data block comprises said specific data block in unchanged form, wherein said specific data block is designed to be used by a receiver of said output data block to estimate a direction towards a transmitter of said output data block based on a received representation of said specific data block.

25. A computer program product comprising a non-transitory computer readable storage medium encoded with instructions that, when executed by a processor, causes an apparatus at least to perform:
   inserting an anti-whitened data block, which is obtainable from a specific data block by anti-whitening, into a data block that is to be whitened by a whitening to yield a whitened data block, wherein said anti-whitening compensates said whitening so that said whitened data block will comprise said specific data block in non-whitened form, and wherein said specific data block is designed to be used by a receiver of said whitened data block to estimate a direction towards a transmitter of said whitened data block based on a received representation of said specific data block.

* * * * *